(12) United States Patent
Kikuchi et al.

(10) Patent No.: US 9,887,590 B2
(45) Date of Patent: Feb. 6, 2018

(54) WIRELESS POWER TRANSMISSION SYSTEM

(71) Applicant: Panasonic Intellectual Property Management Co., Ltd., Osaka (JP)

(72) Inventors: Satoru Kikuchi, Osaka (JP); Tsutomu Sakata, Osaka (JP); Eiji Takahashi, Nara (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 15/258,267

(22) Filed: Sep. 7, 2016

(65) Prior Publication Data

US 2017/0098959 A1 Apr. 6, 2017

Related U.S. Application Data

(60) Provisional application No. 62/236,394, filed on Oct. 2, 2015.

(30) Foreign Application Priority Data

Mar. 18, 2016 (JP) ................................. 2016-054941

(51) Int. Cl.
*H02J 50/10* (2016.01)
*H02J 50/40* (2016.01)
(Continued)

(52) U.S. Cl.
CPC ........... *H02J 50/10* (2016.02); *H01H 47/223* (2013.01); *H02J 50/12* (2016.02); *H02J 50/40* (2016.02);
(Continued)

(58) Field of Classification Search
CPC ........ H01H 47/223; H02M 7/04; H02M 7/44; H02J 50/12; H02J 50/10; H02J 50/40; H02J 50/80; H02J 50/50
(Continued)

(56) References Cited

U.S. PATENT DOCUMENTS 7,884,927 B2 * 2/2011 Onishi .................... H02J 7/025
356/73.1
9,373,971 B2 * 6/2016 Ichikawa ................ H02J 7/007
(Continued)

FOREIGN PATENT DOCUMENTS

JP 2010-154592 7/2010

*Primary Examiner* — Daniel Kessie
(74) *Attorney, Agent, or Firm* — Renner, Otto, Boisselle & Sklar, LLP

(57) ABSTRACT

A wireless power transmission system includes a power control device, a power transmitting device, a relay device, and a power receiving device. The power control device includes a direct-current power supply, and a main control circuit that generates a first load instruction value and a second load instruction value. The power transmitting device returns a first response signal and information on alternating-current power supplied to a load circuit in the relay device, such as a voltage value, when receiving the first load instruction value. The load circuit returns a second response signal when receiving the second load instruction value. The main control circuit determines that not the load circuit but the relay-side power receiving circuit is faulty when not receiving the second response signal within a first period and receiving the first response signal within a second period and not receiving is the information within a second period.

11 Claims, 20 Drawing Sheets

(51) Int. Cl.
*H02J 50/80* (2016.01)
*H02J 50/50* (2016.01)
*H01H 47/22* (2006.01)
*H02M 7/04* (2006.01)
*H02M 7/44* (2006.01)
*H02J 50/12* (2016.01)
*H04B 5/00* (2006.01)

(52) U.S. Cl.
CPC ............. *H02J 50/50* (2016.02); *H02J 50/80* (2016.02); *H02M 7/04* (2013.01); *H02M 7/44* (2013.01); *H04B 5/0037* (2013.01)

(58) Field of Classification Search
USPC ........................................................ 307/104
See application file for complete search history.

(56) References Cited

U.S. PATENT DOCUMENTS

| | | | |
|---|---|---|---|
| 9,722,432 B2 * | 8/2017 | Abe | H02J 5/005 |
| 9,742,199 B2 * | 8/2017 | Abe | H01F 38/14 |
| 2016/0006270 A1 * | 1/2016 | Hosotani | H01F 5/00 |
| | | | 307/104 |
| 2017/0098991 A1 * | 4/2017 | Takahashi | H02J 50/12 |

\* cited by examiner

DUTY 50%

DUTY 25%

WIRELESS POWER TRANSMISSION SYSTEM

BACKGROUND

1. Technical Field

The present disclosure relates to wireless power transmission systems for wireless transmission of power.

2. Description of the Related Art

A wireless (contactless) power transmission technology for wireless (contactless) transmission of power to devices with mobility, such as mobile phones or electric vehicles, is currently being developed. For example, Japanese Unexamined Patent Application Publication No. 2010-154592 discloses a contactless power transmission system that utilizes magnetic resonance for power transmission. In the disclosed system, even when a single power receiving device within a range over which power extends is present for a single power transmitting device, magnetic resonance allows transmission of power to a further power receiving device. Thus, power is supplied to a plurality of loads.

In a system for wireless transmission of power from a power transmitting device to a power receiving device via one or more relay devices to drive a plurality of loads (such as motors) connected to the relay device(s) and the power receiving device, when a fault occurs, the location of the fault is difficult to identify.

SUMMARY

In one general aspect, the techniques disclosed here feature a wireless power transmission system including a power control device, a power transmitting device, a relay device, and a power receiving device. The power control device includes a direct-current power supply and a main control circuit that generates a first load instruction value for the power transmitting device and a second load instruction value for the relay device. The power transmitting device includes a power-transmitting-side inverter circuit that converts direct-current power provided from the direct-current power supply into power-transmitting-side alternating-current power, a power-transmitting-side power transmitting antenna that wirelessly transmits the power-transmitting-side alternating-current power, and a power-transmitting-side control circuit that transmits a first response signal to the first load instruction value to the power control device and controls the power-transmitting-side inverter circuit in accordance with the first load instruction value. The relay device includes a relay-side power receiving circuit, a relay-side power transmitting circuit, and a load circuit. The relay-side power receiving circuit includes i) a relay-side power receiving antenna that receives the power-transmitting-side alternating-current power, ii) a relay-side rectifier that converts the power-transmitting-side alternating-current power into relay-side direct-current power, and iii) a relay-side detection circuit that detects a value corresponding to a voltage value of the relay-side direct-current power. The relay-side power transmitting circuit includes i) a relay-side inverter circuit that converts the relay-side direct-current power into relay-side alternating-current power, and ii) a relay-side power transmitting antenna that wirelessly transmits the relay-side alternating-current power. The load circuit includes i) a load-side inverter circuit that converts the relay-side direct-current power into load-side alternating-current power, ii) a relay-side load that is driven by the load-side alternating-current power, and iii) a load-side control circuit that transmits a second response signal to the second load instruction value to the power control device and controls the relay-side load in accordance with the second load instruction value. The power receiving device includes a power-receiving-side power receiving antenna that receives the relay-side alternating-current power, a power-receiving-side rectifier that converts the relay-side alternating-current power into power-receiving-side direct-current power, and a power-receiving-side load that is driven by using the power-receiving-side direct-current power. The relay-side power receiving circuit included in the relay device transmits the detected value corresponding to the voltage value of the relay-side direct-current power to the power transmitting device. The power-transmitting-side control circuit included in the power transmitting device transmits the value corresponding to the voltage value of the relay-side direct-current power, which is received from the relay-side power receiving circuit, to the power control device. The main control circuit of the power control device determines that not the load circuit but the relay-side power receiving circuit is faulty, and outputs a control signal indicating that the relay-side power receiving circuit is faulty when not receiving the second response signal from the load circuit within a first period and receiving the first response signal from the power transmitting device within a second period and not receiving the value corresponding to the voltage value of the relay-side direct-current power from the power transmitting device within the second period.

General or specific embodiments of the aspect described above may be implemented as a system, a method, an integrated circuit, a computer program, or a recording medium. Alternatively, such general or specific embodiments may be implemented as any selective combination of a system, an apparatus, a method, an integrated circuit, a computer program, and a recording medium.

An aspect of the present disclosure may facilitate accurate fault location in a system for wireless transmission of power from a power transmitting device to a power receiving device via one or more relay devices to drive a plurality of loads (such as motors).

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Prior to the description of embodiments of the present disclosure, underlying knowledge forming the basis of the present disclosure will be described. For clarity, objects related to a power transmitting device are prefixed herein with the words "power-transmitting-side", objects related to a power receiving device with the words "power-receiving-side", objects related to a relay device with the words "relay-side", and objects related to a load circuit with the words "load-side". In some cases, the words "power-transmitting-side", "power-receiving-side", "relay-side", and "load-side" are omitted for simplicity.

The inventors have studied wireless power transmission systems of a multistage connection (or hereinafter also referred to as "cascade connection") type in which one or more relay devices are provided between a power transmitting device and a power receiving device to drive a plurality of loads. Such wireless power transmission systems may be suitable for use in devices including a plurality of loads (for example, motors), such as robot arms. In robot arms, a plurality of portions are rotated or moved by motors. For this reason, power and control signals are individually supplied to the motors for control.

Figure 1:
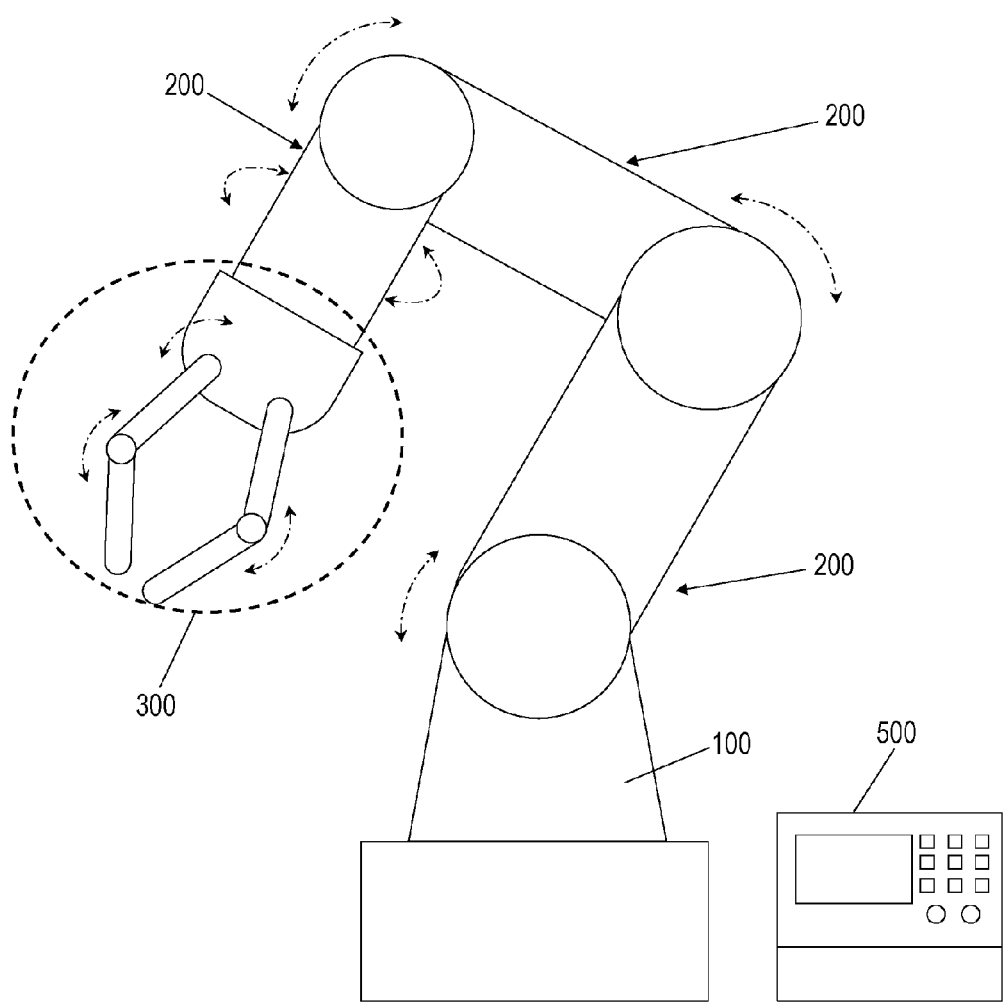
FIG. 1 is a schematic diagram of an example of a wireless power transmission system which is applied to a robot arm.

FIG. 1 is a schematic diagram of an example of a wireless power transmission system which is applied to a robot arm. The wireless power transmission system includes a power transmitting device 100, a power receiving device 300, a plurality of relay devices 200 between the power transmitting device 100 and the power receiving device 300, and a power control device 500 (power controller) that controls power transmission and the driving of loads. In the example illustrated in FIG. 1, the power receiving device 300 is a hand connected to a distal end of the robot arm. The plurality of relay devices 200 are a plurality of arm portions connected between the power transmitting device 100 and the power receiving device 300. In the illustrated example, the plurality of relay devices 200 are provided between the power transmitting device 100 and the power receiving device 300. Alternatively, a single relay device 200 may be used.

The power receiving device 300 and the plurality of relay devices 200 may each include, for example, a load such as a motor, and an inverter circuit that drives the load. The load is disposed in a movable unit (for example, an articulated joint) of the arm, the movable unit being movable by driving a motor. The robot arm has articulated joints which are respectively moved by a plurality of loads to perform operations such as transporting of articles.

Wireless power transmission is performed among the power transmitting device 100, the plurality of relay devices 200, and the power receiving device 300 by using power transmitting antennas and power receiving antennas. The power transmitting device 100 includes a power transmitting antenna and the power transmitting antenna includes a power transmitting coil. The power receiving device 300 includes a power receiving antenna and the power receiving antenna includes a power receiving coil. Each of the relay devices 200 includes both a power receiving antenna and a power transmitting antenna. Power is wirelessly transmitted sequentially from the power transmitting device 100 to the plurality of relay devices 200 and the power receiving device 300, which are coupled in series. The plurality of relay devices 200 and the power receiving device 300 each supply the wirelessly transmitted power to loads connected thereto. The respective loads are driven accordingly.

As in the illustrated example, the application of a wireless power transmission system to a robot arm eliminates the need for a cable for the transmission of power among the power transmitting device 100, the plurality of relay devices 200, and the power receiving device 300. In a traditional robot arm that uses a cable, the cable may limit the movable area of the arm and hand or an accident may be caused by something getting caught in the cable. In addition to such issues, the cable may be an obstruction during the replacement of parts, which may lead to a concern of low working efficiency. As in the example illustrated in FIG. 1, the use of wireless power transmission may prevent an accident caused by something getting caught in a cable, increase the movable area of the arm and hand, and facilitate the replacement of parts.

Figure 2:
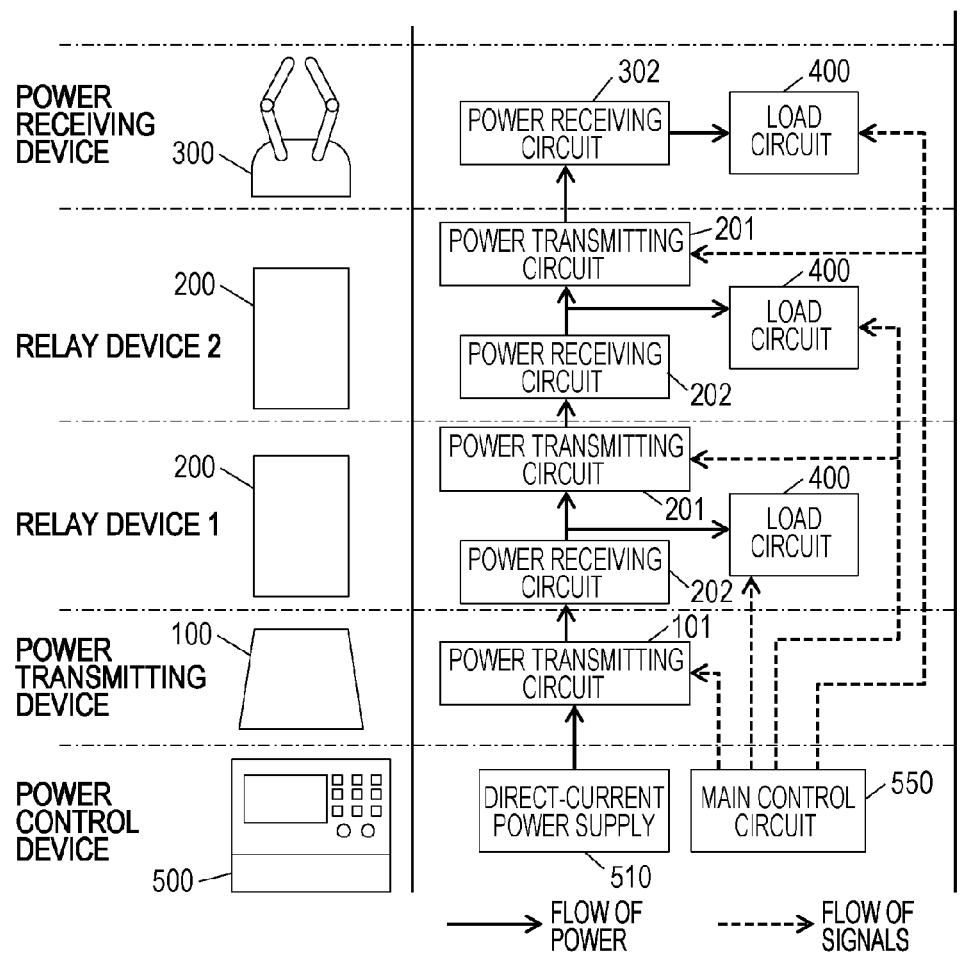
FIG. 2 is a schematic diagram of an example configuration of a wireless power transmission system of a cascade connection type.

FIG. 2 is a schematic diagram of an example configuration of a wireless power transmission system of the cascade connection type described above. For simplicity, an example of two relay devices 200 will be described here. Power is transmitted from a direct-current power supply 510 in the power control device 500 to a power receiving circuit 302 in the power receiving device 300 via a power transmitting circuit 101 in the power transmitting device 100 and a power receiving circuit 202 and a power transmitting circuit 201 in each of the relay devices 200. Each of the power transmitting circuits 101 and 201 includes a power transmitting antenna for wirelessly transmitting power. Each of the power receiving circuits 202 and 302 includes a power receiving antenna for receiving power from a nearby power transmitting antenna. The power receiving circuits 202 of the relay devices 200 and the power receiving circuit 302 of the power receiving device 300 supply power to load circuits 400 connected thereto.

A main control circuit 550 in the power control device 500 controls the operation of the power transmitting circuits 101 and 201 and the load circuits 400. The main control circuit 550 transmits a first load instruction value to the power transmitting circuits 101 and 201 and transmits a second load instruction value to the load circuits 400. The first load instruction value is a signal for driving loads (including inverter circuits, for example) in the power transmitting circuits 101 and 201. The second load instruction value may be a signal for driving loads (including motors or inverter circuits, for example) in the load circuits 400. The first load instruction value may be a control parameter for adjusting, for example, alternating-current power output from the inverter circuits in the power transmitting circuits 101 and 201. As described below, the control parameter may be, for example, the frequency of pulse signals supplied to a plurality of switching elements included in a power-transmitting-side inverter circuit, the phase difference between two pulse signals supplied to two switching elements that are turned on simultaneously, or the duty ratio of pulse signals supplied to a plurality of switching elements. The second load instruction value may be a control parameter for adjusting, for example, the rotational speed of motors in the load circuits 400 or alternating-current power output from inverter circuits that drive the motors. The second load instruction value may be the position of a load or any parameter that determines the operating state of the load, such as the frequency, voltage value, or current value of the power supplied to the load.

The main control circuit 550 controls the level of the voltage of the alternating-current power output from each of the power transmitting circuits 101 and 201 in accordance with the first load instruction value, and controls the operating state of the load (for example, the rotational speed of the motor) in each of the load circuits 400 in accordance with the second load instruction value. Thus, the desired operating state is achievable. The control by the main control circuit 550 may be executed in accordance with, for example, a specified program or a user operation.

Figure 3:
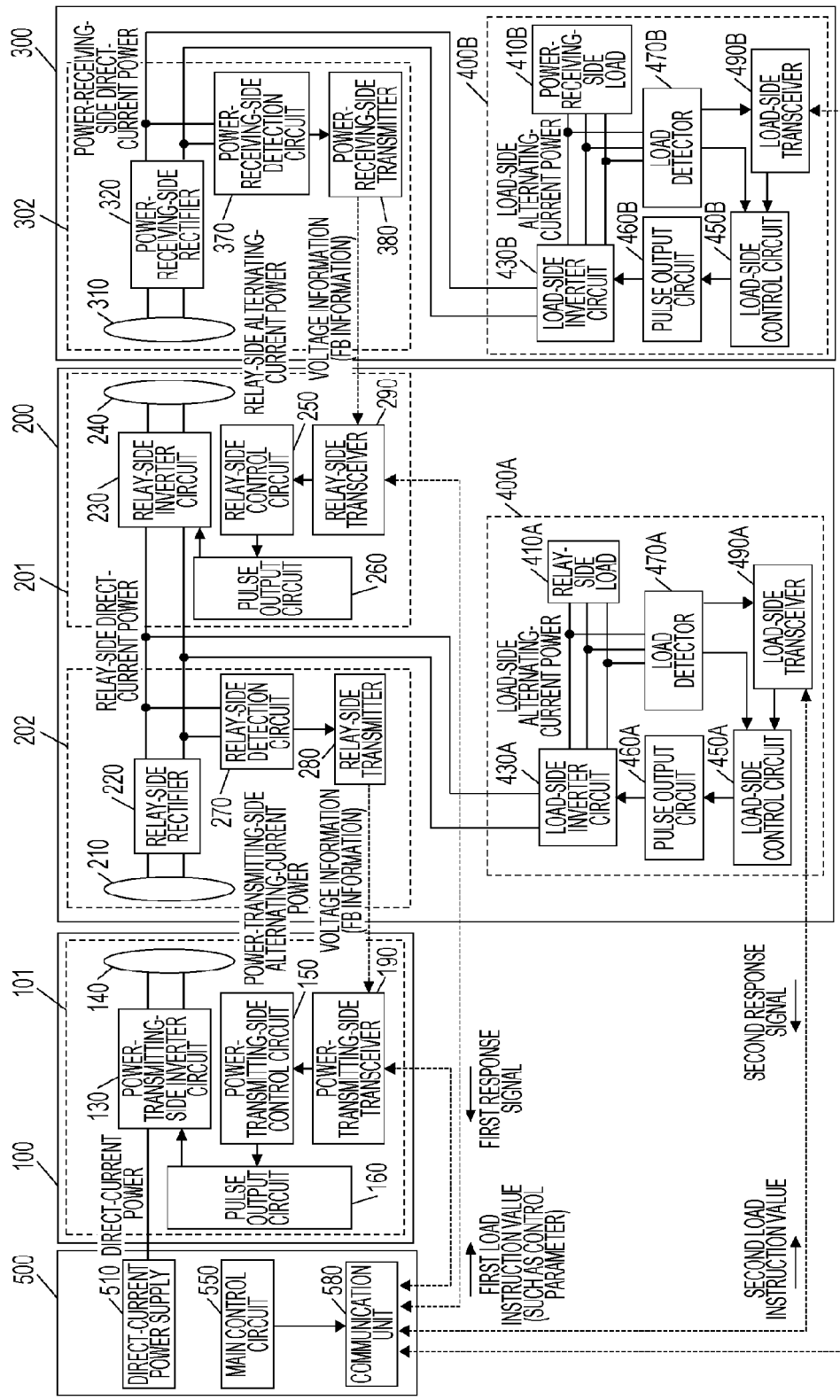
FIG. 3 is a block diagram illustrating an example configuration of a wireless power transmission system (comparative example) including one relay device.

FIG. 3 is a block diagram illustrating an example configuration of a wireless power transmission system (comparative example) including one relay device 200. The wireless power transmission system includes a power control device 500, a power transmitting device 100, a relay device 200, and a power receiving device 300.

The power transmitting device 100 includes a power-transmitting-side power transmitting circuit 101 that performs an operation for transmitting power. The relay device 200 includes a relay-side power receiving circuit 202 that performs an operation for receiving power, a relay-side power transmitting circuit 201 that performs an operation for transmitting power, and a relay-side load circuit 400A that drives a relay-side load 410A. The power receiving device 300 includes a power-receiving-side power receiving circuit 302 that performs an operation for receiving power, and a power-receiving-side load circuit 400B that drives a power-receiving-side load 410B. The power-transmitting-side power transmitting circuit 101 and the relay-side power transmitting circuit 201 have substantially the same configuration. The relay-side power receiving circuit 202 and the power-receiving-side power receiving circuit 302 have substantially the same configuration. The relay-side load circuit 400A and the power-receiving-side load circuit 400B have substantially the same configuration. Each of the power transmitting circuits 101 and 201, the power receiving circuits 202 and 302, and the load circuit 400 may be, for example, a single replaceable electronic circuit.

The illustrated wireless power transmission system supplies power to the two load circuits 400A and 400B, which are respectively connected to the relay device 200 and the power receiving device 300, while transmitting power to the power receiving device 300. During the transmission of the power, feedback (FB) control for maintaining voltage constant is performed. The feedback control is control for adjusting the output voltages of inverter circuits 130 and 230 in the power transmitting circuits 101 and 201, which are located upstream of the load circuits 400A and 400B, so that the load circuits 400A and 400B can be supplied with constant voltage. For feedback control, a relay-side detection circuit 270 in the relay-side power receiving circuit 202 transmits information (feedback information) on the voltage output from a relay-side rectifier 220 to a power-transmitting-side transceiver 190 in the power-transmitting-side power transmitting circuit 101. A power-transmitting-side control circuit 150 controls the power-transmitting-side inverter circuit 130 to suppress variations in voltage in accordance with the feedback information. Likewise, a power-receiving-side detection circuit 370 in the power-receiving-side power receiving circuit 302 transmits information (feedback information) on the voltage output from a power-receiving-side rectifier 320 to a relay-side transceiver 290 in the relay-side power transmitting circuit 201. A relay-side control circuit 250 controls the relay-side inverter circuit 230 to suppress variations in voltage in accordance with the feedback information.

The power control device 500 includes a direct-current power supply 510, a main control circuit 550, and a communication unit 580. The direct-current power supply 510 outputs direct-current power. The main control circuit 550 determines a first load instruction value for controlling the power transmitting circuits 101 and 201, and a second load instruction value for controlling the load circuits 400A and 400B. This determination is performed in accordance with, for example, a specified program or an instruction from a user. The main control circuit 550 causes the communication unit 580 to transmit the first load instruction value and the second load instruction value.

The power-transmitting-side power transmitting circuit 101 in the power transmitting device 100 includes a power-transmitting-side power transmitting antenna 140, the power-transmitting-side inverter circuit 130, a power-transmitting-side pulse output circuit 160, the power-transmitting-side control circuit 150, and the power-transmitting-side transceiver 190. The power-transmitting-side power transmitting antenna 140 is, for example, a resonant circuit including a coil and a capacitor. The power-transmitting-side inverter circuit 130 is connected between the direct-current power supply 510 and the power transmitting antenna 140. The power-transmitting-side inverter circuit 130 converts direct-current power output from the direct-current power supply 510 into power-transmitting-side alternating-current power and supplies the power-transmitting-side alternating-current power to the power transmitting antenna 140. The pulse output circuit 160 outputs a pulse signal for switching between the conducting and non-conducting states of a plurality of switching elements in the power-transmitting-side inverter circuit 130. The power-transmitting-side control circuit 150 adjusts the timing of the pulse signal output from the pulse output circuit 160 to control the level of the voltage of the power-transmitting-side alternating-current power output from the inverter circuit 130. The power-transmitting-side transceiver 190 receives a first load instruction value (for example, a control parameter) from the communication unit 580 in the power control device 500 and returns a first response signal. The power-transmitting-side control circuit 150 determines the timing of the pulse signal output from the pulse output circuit 160 in accordance with the first load instruction value. Thus, the desired operating state indicated by the first load instruction value is achievable. The power-transmitting-side transceiver 190 further receives voltage information (feedback information) transmitted from a relay-side transmitter 280 in the relay device 200. The power-transmitting-side control circuit 150 performs feedback control for making the voltage of the relay-side direct-current power supplied to the relay-side load circuit 400A in the relay device 200 constant in accordance with the feedback (FB) information.

The relay-side power transmitting circuit 201 in the relay device 200 also has a configuration similar to that of the power-transmitting-side power transmitting circuit 101, and performs a similar operation. Specifically, the relay-side power transmitting circuit 201 includes a relay-side power transmitting antenna 240, the relay-side inverter circuit 230, the relay-side control circuit 250, a relay-side pulse output circuit 260, and the relay-side transceiver 290. The relay-side control circuit 250 drives the pulse output circuit 260 to control the relay-side inverter circuit 230 in accordance with the first load instruction value transmitted from the power control device 500. The relay-side control circuit 250 further performs feedback control for making the voltage of the power-receiving-side direct-current power supplied to the power-receiving-side load circuit 400B in the power receiving device 300 constant in accordance with the voltage information (feedback information) transmitted from a power-receiving-side transmitter 380.

The relay-side power receiving circuit 202 includes a relay-side power receiving antenna 210, the relay-side rectifier 220, the relay-side detection circuit 270, and the relay-side transmitter 280. The relay-side power receiving antenna 210 is, for example, a resonant circuit including a coil and a capacitor. The relay-side power receiving antenna 210 is electromagnetically coupled to the power-transmitting-side power transmitting antenna 140 and receives the power-transmitting-side alternating-current power in a contactless manner. The relay-side rectifier 220 is connected between the relay-side power receiving antenna 210 and the relay-side inverter circuit 230 and between the relay-side power receiving antenna 210 and a load-side inverter circuit 430A. The relay-side rectifier 220 converts the power-transmitting-side alternating-current power received by the power receiving antenna 210 into relay-side direct-current power. The relay-side detection circuit 270 detects a voltage value of the relay-side direct-current power output from the relay-side rectifier 220. The relay-side transmitter 280 transmits information (feedback information) indicating the voltage value detected by the relay-side detection circuit 270 to the power-transmitting-side transceiver 190. In accordance with the feedback information, the power-transmitting-side control circuit 150 controls the power-transmitting-side inverter circuit 130 to suppress variations in the relay-side direct-current power. Thus, the voltage of the relay-side direct-current power supplied to the relay-side load circuit 400A is controlled to be substantially constant.

The power-receiving-side power receiving circuit 302 in the power receiving device 300 also has a configuration similar to that of the relay-side power receiving circuit 202, and performs a similar operation. Specifically, the power-receiving-side power receiving circuit 302 includes a power-receiving-side power receiving antenna 310, the power-receiving-side rectifier 320, the power-receiving-side detection circuit 370, and the power-receiving-side transmitter 380. The power-receiving-side rectifier 320 converts the relay-side alternating-current power received by the power-receiving-side power receiving antenna 310 into power-receiving-side direct-current power, and outputs the power-receiving-side direct-current power. The voltage of the power-receiving-side direct-current power is detected by the power-receiving-side detection circuit 370 and is transmitted to the relay-side transceiver 290 by the power-receiving-side transmitter 380 as feedback information. The power-receiving-side direct-current power is supplied to the power-receiving-side load circuit 400B. With the feedback control performed by the relay-side control circuit 250, the voltage of the power-receiving-side direct-current power supplied to the power-receiving-side load circuit 400B is controlled to be substantially constant.

The relay-side load circuit 400A includes the relay-side load 410A, the load-side inverter circuit 430A, a pulse output circuit 460A, a load-side control circuit 450A, a load detector 470A, and a load-side transceiver 490A. The relay-side load 410A may be a device that consumes power, such as a motor, a lighting device, or a camera (imaging element). In the illustrated comparative example, the relay-side load 410A is assumed to be an alternating-current motor driven by alternating-current power. The load-side inverter circuit 430A is connected to the relay-side rectifier 220 via a line extending out from a line between the relay-side rectifier 220 and the relay-side inverter circuit 230. The load-side inverter circuit 430A converts the relay-side direct-current power output from the relay-side rectifier 220 into load-side alternating-current power and outputs the alternating-current power to the relay-side load 410A. The pulse output circuit 460A outputs a pulse signal for switching between the conducting and non-conducting states of a plurality of switching elements in the load-side inverter circuit 430A to the load-side inverter circuit 430A. The load-side control circuit 450A adjusts the timing of the pulse signal output from the pulse output circuit 460A to control the level of the voltage of the load-side alternating-current power output from the inverter circuit 430A. The load-side transceiver 490A receives a second load instruction value from the communication unit 580 in the power control device 500 and returns a second response signal. The load-side control circuit 450A controls the inverter circuit 430A so as to implement the operating state of the load indicated by the second load instruction value. Thus, the relay-side load 410A is driven in the desired operating state (for example, at the desired rotational speed) indicated by the second load instruction value. The load detector 470A detects, for example, the rotational speed of a motor included in the relay-side load 410A, current flowing through the load 410A, or the like. The load-side control circuit 450A adjusts the load-side alternating-current power output from the inverter circuit 430A while monitoring the detection result of the load detector 470A. This configuration makes the operating state of the load 410A close to the desired operating state indicated by the second load instruction value.

The power-receiving-side load circuit 400B also has a configuration similar to that of the relay-side load circuit 400A, and performs a similar operation. Specifically, the power-receiving-side load circuit 400B includes the power-receiving-side load 410B, a load-side inverter circuit 430B, a pulse output circuit 460B, a load-side control circuit 450B, a load detector 470B, and a load-side transceiver 490B. The configuration and operation of these components are similar to the configuration and operation of the corresponding components in the relay-side load circuit 400A, and are not described herein.

With the configuration described above, the main control circuit 550 of the power control device 500 transmits a first load instruction value to the power-transmitting-side power transmitting circuit 101 and the relay-side power transmitting circuit 201, and transmits a second load instruction value to the relay-side load circuit 400A and the power-receiving-side load circuit 400B. Upon receipt of the first load instruction value, the power-transmitting-side power transmitting circuit 101 and the relay-side power transmitting circuit 201 return a first response signal. Upon receipt of the second load instruction value, the relay-side load circuit 400A and the power-receiving-side load circuit 400B return a second response signal. The power-transmitting-side control circuit 150 determines a control parameter of the power-transmitting-side inverter circuit 130 in accordance with the transmitted first load instruction value, and performs power-transmitting control. Likewise, the relay-side control circuit 250 determines a control parameter of the relay-side inverter circuit 230 in accordance with the transmitted first load instruction value, and performs power-transmitting control. The relay-side load circuit 400A determines a control parameter of the relay-side load 410A (such as the rotational speed of a motor) in accordance with the transmitted second load instruction value. Likewise, the power-receiving-side load circuit 400B determines a control parameter of the power-receiving-side load 410B (such as the rotational speed of a motor) in accordance with the transmitted second load instruction value.

The main control circuit 550 of the power control device 500 can perform fault diagnosis based on the presence or absence of the first response signal and the presence or absence of the second response signal. In general, the load circuits 400A and 400B including motors and so on are most likely to be faulty, and thus it is important to promptly identify in which of the load circuits 400A and 400B a fault has occurred.

However, the inventors have found that the configuration in the comparative example described above causes the following problem. If a fault has occurred in any one of the power receiving circuits 202 and 302 and the load circuits 400A and 400B, the location of the fault is difficult to identify. For example, if a first response signal is received from the power-transmitting-side power transmitting circuit 101 and no second response signal is received from the relay-side load circuit 400A, it is difficult to identify which of the relay-side load circuit 400A and the relay-side power receiving circuit 202 is faulty. If a first response signal is received but no second response signal is received, there are conceivable cases where the load circuit 400A is faulty and where the power receiving circuit 202 is faulty. In the case where the load circuit 400A is faulty, the load circuit 400A is not capable of returning a response to the first load instruction value sent from the power control device 500. In the case where the power receiving circuit 202 is faulty, on the other hand, no power is supplied from the power receiving circuit 202 to the load circuit 400A and thus the load circuit 400A is not activated. Therefore, also in this case, the load circuit 400A is not capable of returning a response to the first load instruction value. The term "activation of the load circuit 400A" refers to the activation of the control circuit 450A (for example, a microcontroller) included in the load circuit 400A. A similar problem also occurs when a first response signal is received from the relay-side power transmitting circuit 201 and no second response signal is received from the power-receiving-side load circuit 400B.

As a result of the examination described above, the inventors have conceived the aspects disclosed hereinafter.

A wireless power transmission system according to an aspect of the present disclosure is a wireless power transmission system including a power control device that provides direct-current power, a power transmitting device that converts direct-current power into power-transmitting-side alternating-current power and transmits the power-transmitting-side alternating-current power, a relay device that converts the power-transmitting-side alternating-current power transmitted from the power transmitting device into relay-side alternating-current power and transmits the relay-side alternating-current power, and a power receiving device that receives the relay-side alternating-current power, the power control device including a direct-current power supply, and a main control circuit that generates a first load instruction value for the power transmitting device and a second load instruction value for the relay device, the power transmitting device including a power-transmitting-side inverter circuit that converts direct-current power provided from the direct-current power supply into power-transmitting-side alternating-current power, a power-transmitting-side power transmitting antenna that wirelessly transmits the power-transmitting-side alternating-current power, and a power-transmitting-side control circuit that transmits a first response signal to the first load instruction value to the power control device and controls the power-transmitting-side inverter circuit in accordance with the first load instruction value, the relay device including a relay-side power receiving circuit including
- i) a relay-side power receiving antenna that receives the power-transmitting-side alternating-current power,
- ii) a relay-side rectifier that converts the power-transmitting-side alternating-current power into relay-side direct-current power, and
- iii) a relay-side detection circuit that detects a value corresponding to a voltage value of the relay-side direct-current power, a relay-side power transmitting circuit including
- i) a relay-side inverter circuit that converts the relay-side direct-current power into relay-side alternating-current power, and
- ii) a relay-side power transmitting antenna that wirelessly transmits the relay-side alternating-current power, and a load circuit including
- i) a load-side inverter circuit that converts the relay-side direct-current power into load-side alternating-current power,
- ii) a relay-side load that is driven by the load-side alternating-current power, and
- iii) a load-side control circuit that transmits a second response signal to the second load instruction value to the power control device and controls the relay-side load in accordance with the second load instruction value, the power receiving device including a power-receiving-side power receiving antenna that receives the relay-side alternating-current power, a power-receiving-side rectifier that converts the relay-side alternating-current power into power-receiving-side direct-current power, and a power-receiving-side load that is driven by using the power-receiving-side direct-current power, wherein the relay-side power receiving circuit included in the relay device transmits the detected value corresponding to the voltage value of the relay-side direct-current power to the power transmitting device, wherein the power-transmitting-side control circuit included in the power transmitting device transmits the value corresponding to the voltage value of the relay-side direct-current power, which is received from the relay-side power receiving circuit, to the power control device, and wherein if the second response signal is not received from the load circuit within a first period and if the first response signal is received from the power transmitting device within a second period and the value corresponding to the voltage value of the relay-side direct-current power is not received from the power transmitting device within the second period, the main control circuit of the power control device determines that not the load circuit but the relay-side power receiving circuit is faulty, and outputs a control signal indicating that the relay-side power receiving circuit is faulty.

According to the aspect described above, the power-transmitting-side control circuit included in the power transmitting device transmits the value corresponding to the voltage value of the relay-side direct-current power, which is received from the relay-side power receiving circuit, to the power control device, and if the second response signal is not received from the load circuit within a first period and if the first response signal is received from the power transmitting device within a second period and the value corresponding to the voltage value of the relay-side direct-current power is not received from the power transmitting device within the second period, the main control circuit of the power control device determines that not the load circuit but the relay-side power receiving circuit is faulty, and outputs a control signal indicating that the relay-side power receiving circuit is faulty.

This configuration can achieve quick and accurate fault location when a fault has occurred in the relay-side power receiving circuit. This can expedite the resolution of the fault.

The term "first period" refers to a predetermined period starting at a point in time when the main control circuit transmits a second load instruction value. The term "second period" refers to a predetermined period starting at a point in time when the main control circuit transmits a first load instruction value. The first period and the second period may or may not be equal. If a response signal or a value corresponding to a voltage value is not transmitted even after the lapse of the first period or the second period, a timeout occurs and the main control circuit determines that an anomalous event (or a fault) has occurred.

The term "load instruction value", as used herein, refers to any parameter that determines the operating state of a load. The term "load" is used to not only indicate devices that may be included in a load circuit, such as a motor, a lighting device, and a camera (imaging element) but also indicate devices that may be included in a power transmitting circuit, such as an inverter circuit. The term "first load instruction value" may refer to a control parameter for adjusting alternating-current power output from, for example, an inverter circuit in a power transmitting circuit. The control parameter may be, as described below, for example, the frequency of pulse signals supplied to a plurality of switching elements included in a power-transmitting-side inverter circuit, the phase difference (also referred to as an "amount of phase shift" or an "amount of phase deviation") of two pulse signals supplied to two switching elements that are turned on simultaneously, or the duty ratio of pulse signals supplied to a plurality of switching elements. The term "second load instruction value" may refer to a value indicating, for example, the operating state of a load included in a load circuit. A typical example of the second load instruction value may be a control parameter for adjusting the rotational speed of a motor or alternating-current power output from an inverter circuit that drives the motor. The second load instruction value may be any other parameter that determines the operating state of a load, such as the frequency, voltage value, or current value of the power supplied to the load.

In some cases, information or a signal indicating a load instruction value is herein referred to simply as a "load instruction value". Also, in some cases, information or a signal indicating a value corresponding to a voltage value is herein referred to simply as a "value corresponding to a voltage value". Accordingly, the phrase "transmitting/receiving a load instruction value" refers to transmitting/receiving information or a signal indicating a load instruction value. Also, the phrase "transmitting/receiving a value corresponding to a voltage value" refers to transmitting/receiving information or a signal indicating a value corresponding to a voltage value.

The term "value corresponding to a voltage value" is not limited to the voltage value itself but refers to a value related to the voltage value. The phrase "value corresponding to a voltage value of relay-side direct-current power" may be used to indicate, for example, a "voltage value of relay-side direct-current power", a "current value of relay-side direct-current power", a "power value of relay-side direct-current power", or an "impedance value of relay-side direct-current power". In this way, the term "voltage value" is not to be taken in a limiting sense but any other information such as a "current value", a "power value", or an "impedance value" may be used. Similar advantageous effects are also achievable when information other than a voltage value is used.

In this aspect, if the second response signal is not received from the load circuit within the first period and if the first response signal is received from the power transmitting device within the second period and the value corresponding to the voltage value of the relay-side direct-current power is received from the power transmitting device within the second period, the main control circuit of the power control device may determine that not the relay-side power receiving circuit but the load circuit is faulty, and output a control signal indicating that the load circuit is faulty.

This configuration can achieve quick and accurate fault location when a fault has occurred in a load circuit. This can expedite the resolution of the fault.

According to the aspect described above, if the second response signal has not been received from the load circuit within the first period and if the first response signal has been received from the power transmitting device within the second period, the main control circuit can identify which of the load circuit and the relay-side power receiving circuit is faulty in accordance with whether or not a value corresponding to a voltage value of the relay-side direct-current power has been received. That is, the following problem with the comparative example is also overcome: If a first response signal is received but no second response signal is received, it is difficult to identify which of the load circuit and the power receiving circuit is faulty.

A wireless power transmission system according to another aspect of the present disclosure is a wireless power transmission system including a power control device that provides direct-current power a power transmitting device that converts direct-current power into power-transmitting-side alternating-current power and transmits the power-transmitting-side alternating-current power N relay devices that convert the power-transmitting-side alternating-current power into relay-side alternating-current power and transmit the relay-side alternating-current power, N being an integer greater than or equal to 2, and a power receiving device that receives the relay-side alternating-current power, the power transmitting device including
a power-transmitting-side inverter circuit that converts direct-current power into the power-transmitting-side alternating-current power,
a power-transmitting-side power transmitting antenna that wirelessly transmits the power-transmitting-side alternating-current power, and
a power-transmitting-side control circuit that controls the power-transmitting-side inverter circuit to adjust the power-transmitting-side alternating-current power,
the N relay devices including
a sequentially first relay device,
an i-th relay device, i being an integer greater than or equal to 2 and less than or equal to N, the i-th relay device including an N-th relay device, and
an (i−1)-th relay device,
the sequentially first relay device including
a first relay-side power receiving circuit including
i) a first relay-side power receiving antenna that receives the power-transmitting-side alternating-current power, and
ii) a first relay-side rectifier that converts the power-transmitting-side alternating-current power into first relay-side direct-current power, and
a first relay-side power transmitting circuit including
i) a first relay-side inverter circuit that converts the first relay-side direct-current power into first relay-side alternating-current power, and
ii) a first relay-side power transmitting antenna that wirelessly transmits the first relay-side alternating-current power,
the i-th relay device including
an i-th relay-side power receiving circuit including
i) an i-th relay-side power receiving antenna that receives (i−1)-th relay-side alternating-current power from the (i−1)-th relay device,
ii) an i-th relay-side rectifier that converts the (i−1)-th relay-side alternating-current power into i-th relay-side direct-current power, and
iii) an i-th relay-side detection circuit that detects a value corresponding to a voltage value of the i-th relay-side direct-current power,
an i-th relay-side power transmitting circuit including
i) an i-th relay-side inverter circuit that converts the i-th relay-side direct-current power into i-th relay-side alternating-current power, and
ii) an i-th relay-side power transmitting antenna that wirelessly transmits the i-th relay-side alternating-current power, and
an i-th load circuit including
i) an i-th load-side inverter circuit that converts the i-th relay-side direct-current power into i-th load-side alternating-current power,
ii) an i-th relay-side load that is driven by the i-th load-side alternating-current power, and
iii) an i-th load-side control circuit that controls the i-th relay-side load,
the power receiving device including
a power-receiving-side power receiving antenna that receives N-th relay-side alternating-current power from the N-th relay device,
a power-receiving-side rectifier that converts the N-th relay-side alternating-current power into power-receiving-side direct-current power, and
a power-receiving-side load that is driven by using the power-receiving-side direct-current power,
the power control device including
a direct-current power supply, and
a main control circuit that generates a first load instruction value for the (i−1)-th relay device and a second load instruction value for the i-th relay device,
the (i−1)-th relay device including
an (i−1)-th relay-side power transmitting circuit including
an (i−1)-th relay-side inverter circuit, and
an (i−1)-th relay-side control circuit,
wherein the (i−1)-th relay-side power transmitting circuit transmits a first response signal to the first load instruction value to the power control device, and controls the (i−1)-th relay-side inverter circuit in accordance with the first load instruction value, wherein the i-th load circuit included in the i-th relay device transmits a second response signal to the second load instruction value to the power control device, and controls the i-th load-side inverter circuit in accordance with the second load instruction value, wherein the i-th relay-side power receiving circuit included in the i-th relay device transmits the value corresponding to the voltage value of the i-th relay-side direct-current power detected by the i-th relay-side detection circuit to the (i−1)-th relay device, wherein the (i−1)-th relay-side control circuit included in the (i−1)-th relay device transmits the value corresponding to the voltage value of the i-th relay-side direct-current power, which is received from the i-th relay-side power receiving circuit, to the power control device, and wherein if the second response signal is not received from the i-th load circuit within a first period and if the first response signal is received from the (i−1)-th relay-side power transmitting circuit within a second period and the value corresponding to the voltage value of the i-th relay-side direct-current power is not received from the (i−1)-th relay-side power transmitting circuit within the second period, the main control circuit of the power control device determines that not the i-th load circuit but the i-th relay-side power receiving circuit is faulty, and outputs a control signal indicating that the i-th relay-side power receiving circuit is faulty.

According to the aspect described above, the (i−1)-th relay-side control circuit included in the (i−1)-th relay device transmits the value corresponding to the voltage value of the i-th relay-side direct-current power, which is received from the i-th relay-side power receiving circuit, to the power control device, and if the second response signal is not received from the i-th load circuit within a first period and if the first response signal is received from the (i−1)-th relay-side power transmitting circuit within a second period and the value corresponding to the voltage value of the i-th relay-side direct-current power is not received from the (i−1)-th relay-side power transmitting circuit within the second period, the main control circuit of the power control device determines that not the i-th load circuit but the i-th relay-side power receiving circuit is faulty, and outputs a control signal indicating that the i-th relay-side power receiving circuit is faulty.

This configuration may achieve advantageous effects similar to those of the aspect described above even in a wireless power transmission system including a plurality of (e.g., N) relay devices. That is, the main control circuit can achieve quick and accurate fault location when the i-th relay-side power receiving circuit is faulty. This can expedite the resolution of the fault.

In this aspect, if the second response signal is not received from the i-th load circuit within the first period and if the first response signal is received from the (i−1)-th relay-side power transmitting circuit within the second period and the value corresponding to the voltage value of the i-th relay-side direct-current power is received from the (i−1)-th relay-side power transmitting circuit within the second period, the main control circuit of the power control device may determine that not the i-th relay-side power receiving circuit but the i-th load circuit is faulty, and output a control signal indicating that the i-th load circuit is faulty.

This configuration allows the main control circuit to achieve quick and accurate fault location when the i-th load circuit is faulty. This can expedite the resolution of the fault.

According to the aspect described above, if the second response signal has not been received from the i-th load circuit within the first period and if the first response signal has been received from the (i−1)-th relay-side power transmitting circuit within the second period, it is possible to identify which of the i-th load circuit and the i-th relay-side power receiving circuit is faulty in accordance with whether or not a value corresponding to a voltage value of the i-th relay-side direct-current power has been received within the second period. Thus, the following problem with the comparative example is overcome: If a first response signal is received but no second response signal is received, it is difficult to whether the load circuit is faulty or the power receiving circuit is faulty.

The sequentially first relay device may further include a first load circuit, the first load circuit including i) a first load-side inverter circuit that converts the first relay-side direct-current power into first load-side alternating-current power, ii) a first relay-side load that is driven by the first load-side alternating-current power, and iii) a first load-side control circuit that controls the first relay-side load.

The main control circuit included in the power control device may generate a third load instruction value for the power transmitting device and a fourth load instruction value for the sequentially first relay device, the power-transmitting-side control circuit included in the power transmitting device may perform control to transmit a third response signal to the third load instruction value to the power control device, and controls the power-transmitting-side inverter circuit in accordance with the third load instruction value, the first load circuit included in the sequentially first relay device may perform control to transmit a fourth response signal to the fourth load instruction value to the power control device, and controls the first load-side inverter circuit in accordance with the fourth load instruction value, the first relay-side power receiving circuit included in the sequentially first relay device may further include a first relay-side detection circuit that detects a value corresponding to a voltage value of the first relay-side direct-current power, and perform control to transmit the detected value corresponding to the voltage value of the first relay-side direct-current power to the power transmitting device, the power-transmitting-side control circuit included in the power transmitting device may perform control to transmit the value corresponding to the voltage value of the first relay-side direct-current power, which is received from the first relay-side power receiving circuit, to the power control device, and if the fourth response signal is not received from the first load circuit within the first period and if the third response signal is received from the power-transmitting-side control circuit within the second period and the value corresponding to the voltage value of the first relay-side direct-current power is not received from the power-transmitting-side control circuit within the second period, the main control circuit of the power control device may determine that not the first load circuit but the first relay-side power receiving circuit is faulty, and output a control signal indicating that the first relay-side power receiving circuit is faulty.

This configuration allows the main control circuit to achieve quick and accurate fault location when the first relay-side power receiving circuit is faulty. This can expedite the resolution of the fault.

The "third load instruction value", the "fourth load instruction value", the "third response signal", and the "fourth response signal" are signals similar to the "first load instruction value", the "second load instruction value", the "first response signal", and the "second response signal" described above, respectively.

If the fourth response signal is not received from the first load circuit within the first period and if the third response signal is received from the power-transmitting-side control circuit within the second period and the value corresponding to the voltage value of the first relay-side direct-current power is received from the power-transmitting-side control circuit within the second period, the main control circuit of the power control device may determine that not the first relay-side power receiving circuit but the first load circuit is faulty, and output a control signal indicating that the first load circuit is faulty.

This configuration allows the main control circuit to achieve quick and accurate fault location when the first load circuit is faulty. This can expedite the resolution of the fault.

The power control device may further include a display, and the control signal may be output from the main control circuit to the display.

This allows a user to easily identify the location of the fault on the basis of information displayed on the display.

In the following, more specific embodiments of the present disclosure will be described. Note that detailed description more than necessary may be omitted. For example, the detailed description of well-known matters or repeated description of substantially the same configuration may be omitted. This is for preventing the following description from being unnecessarily redundant, thus facilitating the understanding by those skilled in the art. The inventors provide the accompanying drawings and the following description to help those skilled in the art fully understand the present disclosure, and do not intend to limit the claimed subject matter to the specific given in the drawings and the description. In the following description, the same or similar components are given the same reference numerals.

First Embodiment

Figure 4:
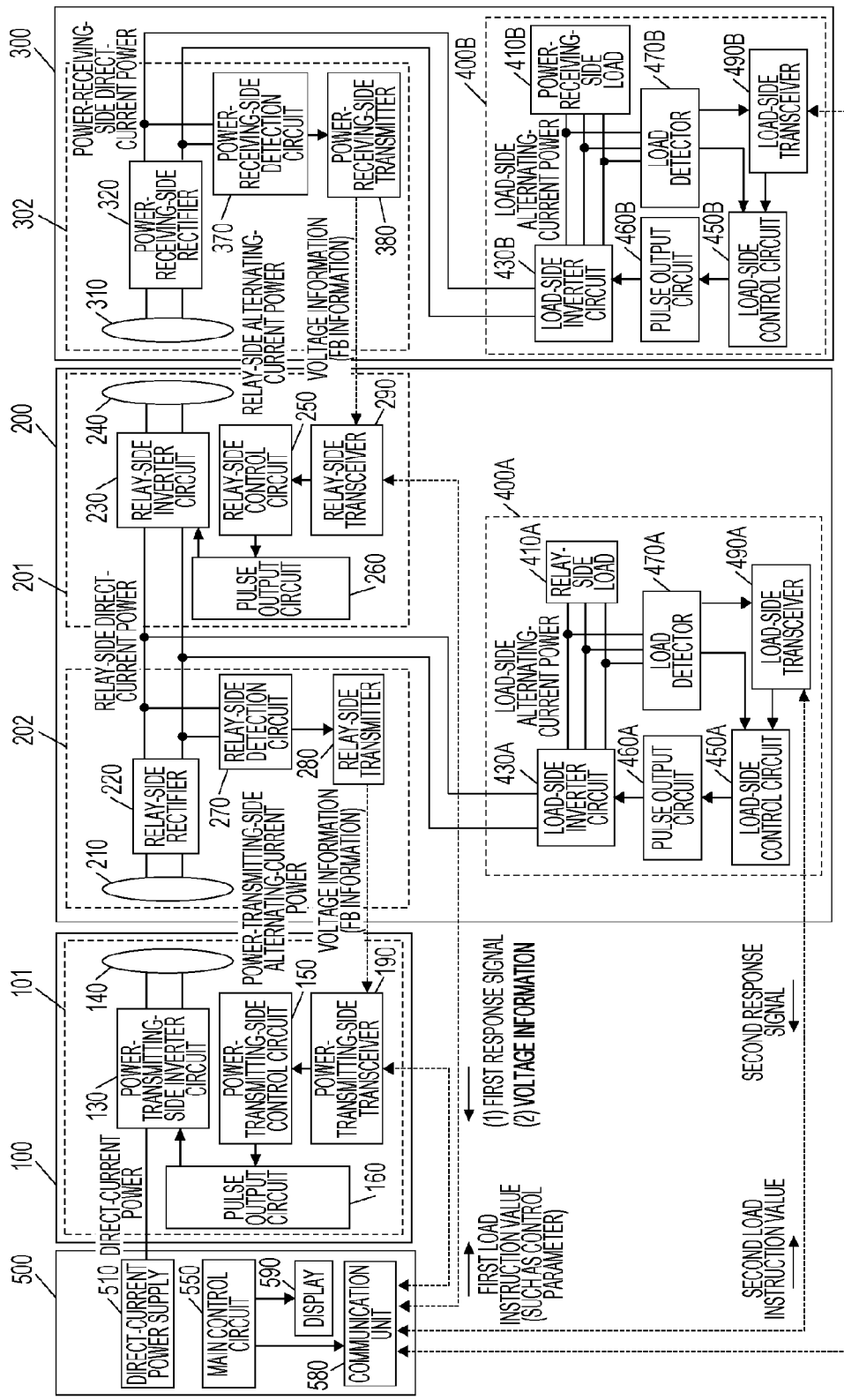
FIG. 4 is a block diagram illustrating the configuration of a wireless power transmission system according to a first embodiment of the present disclosure.

FIG. 4 is a block diagram illustrating the configuration of a wireless power transmission system according to a first embodiment of the present disclosure. The wireless power transmission system according to this embodiment includes a single relay device 200. The primary difference between the wireless power transmission system according to this embodiment and the wireless power transmission system in the comparative example illustrated in FIG. 3 is that the power control device 500 includes a display 590 and the power-transmitting-side power transmitting circuit 101 and the relay-side power transmitting circuit 201 transmit voltage information, in addition to a first response signal, to the power control device 500. This configuration allows the main control circuit 550 in the power control device 500 to identify, when a fault has occurred, the location of the fault in accordance with whether a first response signal, a second response signal, and voltage information have been received or not. In the following, the configuration and operation of the wireless power transmission system according to this embodiment will be described focusing on the difference from that of the comparative example.

The wireless power transmission system according to this embodiment includes a power control device 500 that outputs direct-current power, a power transmitting device 100 that converts the direct-current power into power-transmitting-side alternating-current power and transmits the power-transmitting-side alternating-current power, a relay device 200 that converts the power-transmitting-side alternating-current power transmitted from the power transmitting device 100 into relay-side alternating-current power and transmits the relay-side alternating-current power, and a power receiving device 300 that receives the relay-side alternating-current power.

The physical configuration of the power transmitting device 100, the relay device 200, and the power receiving device 300 is the same as the physical configuration of that in the comparative example illustrated in FIG. 3. Note that, in this embodiment, upon receipt of a first load instruction value from the power control device 500, the power-transmitting-side power transmitting circuit 101 transmits, in addition to a first response signal, voltage information (FB information) obtained from the relay-side power receiving circuit 202 to the power control device 500. Likewise, upon receipt of a first load instruction value from the power control device 500, the relay-side power transmitting circuit 201 transmits, in addition to a first response signal, information on a voltage value (also referred to as voltage information) included in a feedback signal (also referred to as an FB signal or FB information) obtained from the power-receiving-side power receiving circuit 302 to the power control device 500. This configuration allows the main control circuit 550 of the power control device 500 to identify the location of the fault in accordance with the reception state of the first response signal, the second response signal, and the voltage information. In this embodiment, voltage information indicating a voltage value of the relay-side direct-current power is used. Alternatively, any other information sent from the relay-side power receiving circuit 202 may be used. For example, the power-transmitting-side power transmitting circuit 101 may obtain information on a current value of the relay-side direct-current power, a power value of the relay-side direct-current power, or an impedance value of the relay-side direct-current power from the relay-side power receiving circuit 202, and transmit the obtained information to the power control device 500 together with the first response signal. The following description is based on the assumption that information on a voltage value included in a feedback signal is mainly used.

The power control device 500 includes a direct-current power supply 510, a main control circuit 550 that generates a first load instruction value for the power transmitting device 100 and a second load instruction value for the relay device 200, a communication unit 580 (communication circuit), and a display 590. The power control device 500 is a controller that controls the devices included in the wireless power transmission system. The main control circuit 550 transmits signals such as the first load instruction value and the second load instruction value to transceivers 190 and 290 (communication circuits) in the power transmitting device 100 and the relay device 200 via the communication unit 580, and receives a first response signal, voltage information, and a second response signal from the transceivers 190 and 290. When any one of the power transmitting circuits 101 and 201, the power receiving circuits 202 and 302, and the load circuits 400A and 400B has failed, the main control circuit 550 identifies which circuit has failed in accordance with the reception state of the first response signal, the voltage information, and the second response signal. Then, the main control circuit 550 outputs fault information on the corresponding circuit to the display 590. This allows a user (for example, the manager of the wireless power transmission system) to view fault information on each circuit.

The power-transmitting-side power transmitting circuit 101 in the power transmitting device 100 includes a power-transmitting-side inverter circuit 130 that converts direct-current power output from the direct-current power supply 510 into power-transmitting-side alternating-current power, a power-transmitting-side power transmitting antenna 140 that wirelessly transmits the power-transmitting-side alternating-current power, a pulse output circuit 160, a power-transmitting-side control circuit 150, and the power-transmitting-side transceiver 190. The power-transmitting-side control circuit 150 transmits a first response signal to the first load instruction value to the power control device 500 via the power-transmitting-side transceiver 190. Further, the power-transmitting-side control circuit 150 controls the power-transmitting-side inverter circuit 130 via the pulse output circuit 160 in accordance with the first load instruction value. When transmitting the first response signal, the power-transmitting-side control circuit 150 transmits voltage information indicating the voltage value of the relay-side direct-current power received from the relay-side power receiving circuit 202 to the power control device 500. Instead of the voltage information, any other information such as power or current information may be transmitted.

The relay device 200 includes the relay-side power receiving circuit 202, the relay-side power transmitting circuit 201, and a load circuit 400A.

The relay-side power receiving circuit 202 includes a relay-side power receiving antenna 210 that receives the power-transmitting-side alternating-current power, a relay-side rectifier 220 that converts the power-transmitting-side alternating-current power into relay-side direct-current power, a relay-side detection circuit 270 that detects a voltage value of the relay-side direct-current power, and a relay-side transmitter 280. The relay-side transmitter 280 transmits voltage information (FB information) indicating the detected voltage value to the power-transmitting-side transceiver 190. The information indicating the voltage value may be information indicating a value such as a power or current value.

The relay-side power transmitting circuit 201 includes a relay-side inverter circuit 230 that converts the relay-side direct-current power into relay-side alternating-current power, a relay-side power transmitting antenna 240 that wirelessly transmits the relay-side alternating-current power, a pulse output circuit 260 that drives the relay-side inverter circuit 230, and a relay-side control circuit 250 that controls the output timing of a pulse signal from the pulse output circuit 260. Similarly to the power-transmitting-side control circuit 150, the relay-side control circuit 250 transmits a first response signal to the first load instruction value to the power control device 500 via the relay-side transceiver 290. Further, the relay-side control circuit 250 controls the relay-side inverter circuit 230 in accordance with the first load instruction value via the pulse output circuit 260. When transmitting the first response signal, the relay-side control circuit 250 transmits voltage information indicating a voltage value of power-receiving-side direct-current power received from the power-receiving-side power receiving circuit 302 to the power control device 500.

The relay-side load circuit 400A includes a load-side inverter circuit 430A that converts the relay-side direct-current power into load-side alternating-current power, a relay-side load 410A that is driven by the load-side alternating-current power, a pulse output circuit 460A, a load-side control circuit 450A, a load detector 470A, and a load-side transceiver 490A. The load-side control circuit 450A transmits a second response signal to the second load instruction value to the power control device 500 via the load-side transceiver 490A. Further, the load-side control circuit 450A drives the pulse output circuit 460A in accordance with the second load instruction value to control the load-side inverter circuit 430A. Thus, the relay-side load 410A is controlled. During this control, the load-side control circuit 450A adjusts the output timing of the pulse signal output from the pulse output circuit 460A in accordance with the operating state of the load 410A (such as the rotational speed of a motor or input current) detected by the load detector 470A. This configuration makes the operating state of the relay-side load 410A close to an operating state indicated by the second load instruction value.

The power receiving device 300 includes the power-receiving-side power receiving circuit 302 and a power-receiving-side load circuit 400B. The power-receiving-side power receiving circuit 302 includes a power-receiving-side power receiving antenna 310 that receives the relay-side alternating-current power, a power-receiving-side rectifier 320 that converts the relay-side alternating-current power into power-receiving-side direct-current power, a power-receiving-side detection circuit 370, and a power-receiving-side transmitter 380. The power-receiving-side load circuit 400B includes a load-side inverter circuit 430B that converts the power-receiving-side direct-current power into load-side alternating-current power, a power-receiving-side load 410B that is driven by the load-side alternating-current power, a pulse output circuit 460B, a load-side control circuit 450B, a load detector 470B, and a load-side transceiver 490B. The load-side control circuit 450B transmits a second response signal to the second load instruction value to the power control device 500 via the load-side transceiver 490B. Further, the load-side control circuit 450B drives the pulse output circuit 460B in accordance with the second load instruction value to control the load-side inverter circuit 430B. Thus, the power-receiving-side load 410B is controlled. During this control, the load-side control circuit 450B adjusts the output timing of the pulse signal output from the pulse output circuit 460B in accordance with the operating state of the load 410B (such as the rotational speed of a motor or input current) detected by the load detector 470B. This configuration makes the operating state of the relay-side load 410B close to an operating state indicated by the second load instruction value.

In this embodiment, the power receiving device 300 is a hand connected to a distal end of a robot arm, or may be any other device. For example, the power receiving device 300 may be a rotating unit or the like of a surveillance camera. In this embodiment, each of the loads 410A and 410B is a device including a motor, such as an actuator mounted in an articulated joint of the robot arm or in the hand. Each of the loads 410A and 410B may be a lighting device, a camera including an image sensor such as a charge-coupled device (CCD) sensor mounted in a rotating unit of a surveillance camera, or the like.

The load-side alternating-current power may be single-phase alternating-current power or three-phase alternating-current power. When the loads 410A and 410B are permanent magnet synchronous motors, induction motors, or the like, inverter circuits that output three-phase alternating-current power are used as the load-side inverter circuits 430A and 430B. In the load circuits 400A and 400B, direct-current power may be input to the loads 410A and 410B. In this case, the load-side inverter circuits 430A and 430B and the pulse output circuits 460A and 460B may be omitted. This configuration may be applied when the loads 410A and 410B are devices driven by direct-current power, such as direct-current motors. In this case, the load circuits 400A and 400B may include adjustment circuits capable of adjusting the voltage or current of the direct-current power input to the load circuits 400A and 400B.

Figure 5:
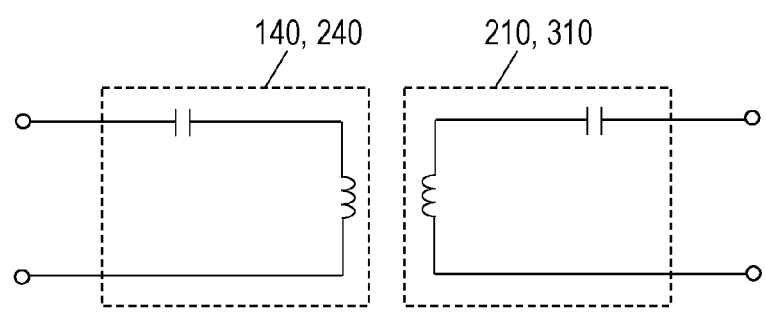
FIG. 5 is a diagram illustrating an example equivalent circuit of power transmitting antennas (a power-transmitting-side power transmitting antenna and a relay-side power transmitting antenna) and power receiving antennas (a relay-side power receiving antenna and a power-receiving-side power receiving antenna), the power transmitting antennas and the power receiving antennas each having the configuration of a series resonant circuit.

The power transmitting antennas 140 and 240 and the power receiving antennas 210 and 310 may be each implemented as, for example, a resonant circuit including a coil and a capacitor. FIG. 5 illustrates an example equivalent circuit of the power transmitting antennas 140 and 240 and the power receiving antennas 210 and 310, each antenna having the configuration of a series resonant circuit. Each antenna is not limited to that in the illustrated example and may have the configuration of a parallel resonant circuit. A coil in each of the power transmitting antennas 140 and 240 is referred to herein as a "power transmitting coil" and a coil in each of the power receiving antennas 210 and 310 is referred to herein as a "power receiving coil". Inductive coupling (i.e., magnetic field coupling) between a power transmitting coil and a power receiving coil enables power to be transmitted wirelessly. Each antenna may have a configuration in which electric field coupling instead of magnetic field coupling power is utilized for the wireless transmission of power. In this case, each antenna may include two electrodes for transmitting power or receiving power, and a resonant circuit that includes an inductor and a capacitor. A power transmitting antenna and a power receiving antenna that employ electric field coupling are suitable for use in the wireless transmission of power to a moving device such as a transfer robot in a factory.

The main control circuit 550, the power-transmitting-side control circuit 150, the relay-side control circuit 250, and the load-side control circuits 450A and 450B may be each an integrated circuit including a processor and a memory, such as a microcontroller. The memory may store a control program (software) for implementing the operations in this embodiment and various tables. The processor executes the control program, thereby implementing the functions according to this embodiment. Each control circuit may be implemented not in software but only in hardware.

The method of communication between the communication unit 580 and each of the power-transmitting-side transceiver 190, the relay-side transceiver 290, and the load-side transceivers 490A and 490B is not limited to a specific method and any method may be used. For example, a wireless communication scheme such as wireless local area network (LAN) or Zigbee® may be used. The method of communication between the power-transmitting-side transceiver 190 and the relay-side transmitter 280 and between the relay-side transceiver 290 and the power-receiving-side transmitter 380 is not also limited to a specific method and any method may be used. For example, a wireless communication scheme such as amplitude modulation, frequency modulation, wireless LAN, or Zigbee® may be used.

The power-transmitting-side control circuit 150 determines the voltage of the power-transmitting-side alternating-current power in accordance with the first load instruction value sent from the power control device 500, and controls the inverter circuit 130 by using the control parameter. The control circuit 150 outputs a control signal to the pulse output circuit 160 (for example, a gate driver), thereby controlling the inverter circuit 130. The control circuit 150 further performs control (feedback control) to suppress variations in the voltage of the relay-side direct-current power by using the inverter circuit 130.

The first load instruction value may be a control parameter for controlling, for example, the inverter circuit 130. The term "control parameter" refers to a parameter for determining the level of the voltage output from the inverter circuit 130. The control parameter may be, for example, the frequency of pulse signals supplied to a plurality of switching elements included in the inverter circuit 130, the amount of phase shift between two pulse signals supplied to two switching elements that are turned on simultaneously, or the duty ratio of pulse width modulation (PWM) pulse signals respectively supplied to the plurality of switching elements. Although not illustrated in FIG. 4, a direct current to direct current (DC-DC) converter may be provided upstream of the inverter circuit 130 and the power-transmitting-side control circuit 150 may change the magnitude of the voltage of the direct-current power input to the inverter circuit 130. In this configuration, the value of the output voltage of the DC-DC converter may be used as a control parameter. The control circuit 150 can change the switching frequency of a switching element in the DC-DC converter to adjust the magnitude of the voltage output from the DC-DC converter. By changing the control parameter described above, the level of the voltage of the alternating-current power output from the inverter circuit 130 can be changed to change the amplitude of the alternating-current power received by the relay device 200.

Figure 6A:
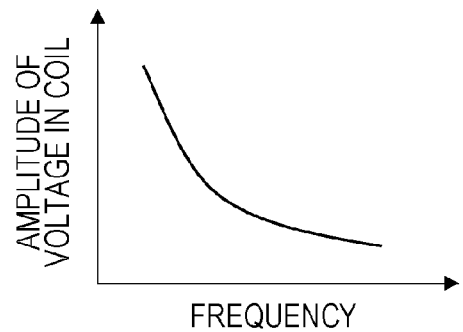
FIG. 6A is a schematic diagram of an example of the dependence of the amplitude of a voltage across a coil of the power-transmitting-side power transmitting antenna with respect to frequency.
Figure 6B:
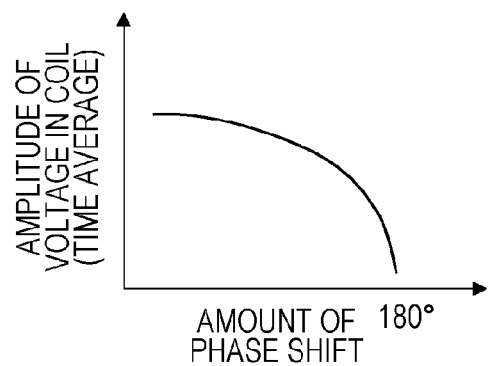
FIG. 6B is a schematic diagram of an example of the dependence of the amplitude of the voltage across the coil of the power-transmitting-side power transmitting antenna with respect to amount of phase shift.
Figure 6C:
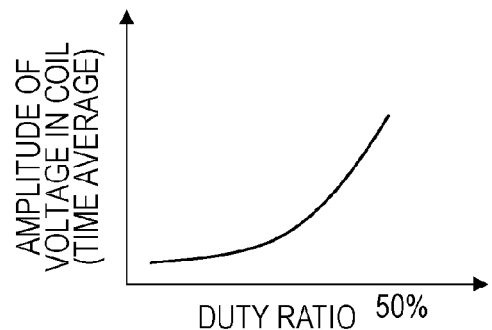
FIG. 6C is a schematic diagram of an example of the dependence of the amplitude of the voltage across the coil of the power-transmitting-side power transmitting antenna with respect to duty ratio.
Figure 6D:
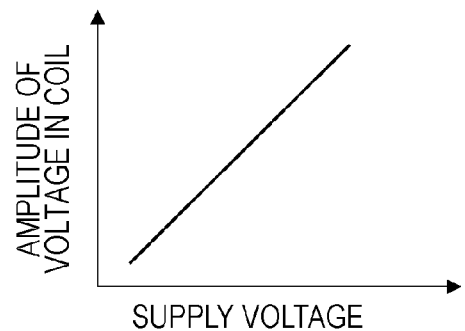
FIG. 6D is a schematic diagram of an example of the dependence of the amplitude of the voltage across the coil of the power-transmitting-side power transmitting antenna with respect to supply voltage to a power-transmitting-side inverter circuit.

FIGS. 6A to 6D schematically illustrate an example of the dependence of the amplitude of the voltage across the coil of the power transmitting antenna 140 with respect to frequency, amount of phase shift, duty ratio, and supply voltage to the inverter circuit 130, respectively. As illustrated in FIG. 6A, there is a tendency that as the frequency increases, the amplitude of the voltage across the coil decreases. In the low-frequency domain, however, there is conversely a tendency that as the frequency decreases, the amplitude of the voltage increases. As illustrated in FIG. 6B, as the amount of phase shift increases in the range of 0° to 180°, the time average of the amplitude of the voltage across the coil decreases. As illustrated in FIG. 6C, as the duty ratio increases in the range of 0% to 50%, the time average of the amplitude of the voltage across the coil increases. As illustrated in FIG. 6D, as the voltage supplied to the inverter circuit 130 increases, the amplitude of the voltage across the coil increases. Accordingly, the control circuit 150 can control the amplitude of the voltage across the coil of the power transmitting antenna 140 or its time average value by using at least one of the frequency, the amount of phase shift, the duty ratio, and the supply voltage as a control parameter.

Figure 7:
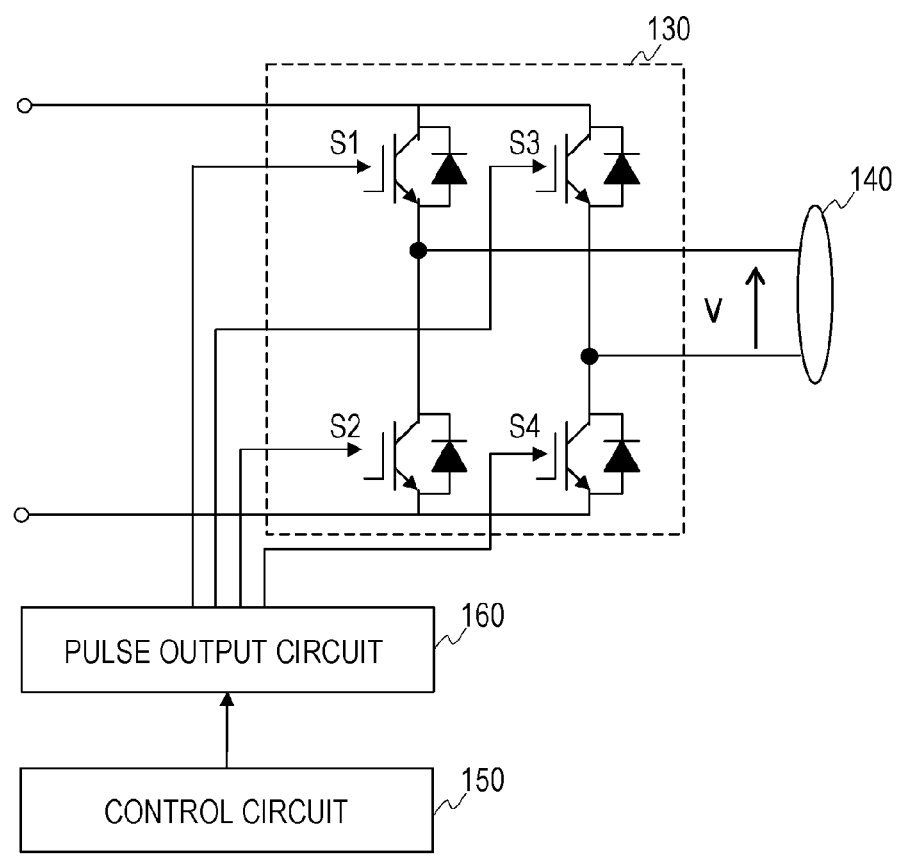
FIG. 7 is a diagram illustrating an example configuration of the power-transmitting-side inverter circuit.

FIG. 7 is a diagram illustrating an example configuration of the inverter circuit 130. The inverter circuit 130 includes a plurality of switching elements S1 to S4, each of which switches between its conducting and non-conducting states in accordance with a pulse signal supplied from the pulse output circuit 160. By changing between the conducting and non-conducting states of each of the switching elements S1 to S4, the input direct-current power can be converted into alternating-current power. In the example illustrated in FIG. 7, a full-bridge inverter circuit including the four switching elements S1 to S4 is used. In the illustrated example, each switching element is an insulated-gate bipolar transistor (IGBT). Alternatively, any other kind of switching element such as a metal oxide semiconductor field-effect transistor (MOSFET) may be used.

In the example illustrated in FIG. 7, the switching elements S1 and S4 (a first switching element pair) among the four switching elements S1 to S4 output a voltage having the same polarity as that of the supplied direct-current voltage during the conducting period. In contrast, the switching elements S2 and S3 (a second switching element pair) output a voltage having a polarity opposite to that of the supplied direct-current voltage during the conducting period. The pulse output circuit 160 supplies a pulse signal to the gates of the four switching elements S1 to S4 in accordance with an instruction from the control circuit 150. In this case, the phase difference between two pulse signals supplied to the first switching element pair (S1 and S4) and the phase difference between two pulse signals supplied to the second switching element pair (S2 and S3) can be adjusted to perform amplitude control.

Figure 8A:
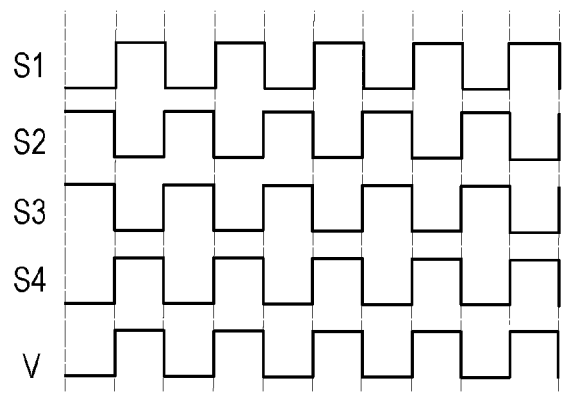
FIG. 8A is a schematic diagram of changes in pulse signals and a change in voltage over time when an amount of phase shift is 0 degrees.
Figure 8B:
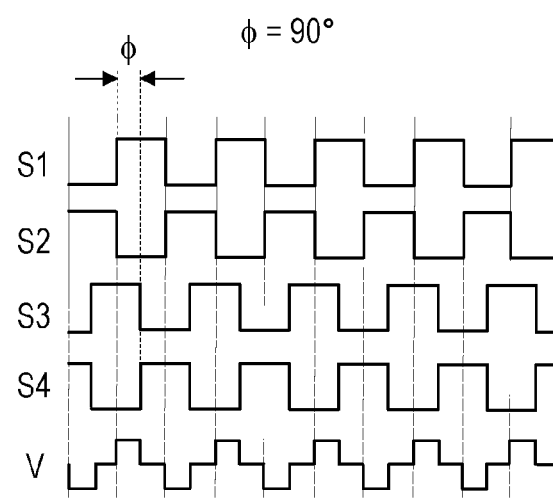
FIG. 8B is a schematic diagram of changes in pulse signals and a change in voltage over time when an amount of phase shift φ is 90 degrees.

FIGS. 8A and 8B are diagrams illustrating amplitude control based on a phase difference of pulse signals. FIG. 8A schematically illustrates changes in four pulse signals and a voltage V output from the inverter circuit 130 over time when an amount of phase shift φ between two pulse signals supplied to the switching elements S1 and S4 and an amount of phase shift φ between two pulse signals supplied to the switching elements S2 and S3 are 0 degrees. FIG. 8B schematically illustrates changes in the pulse signals and the voltage V over time when the amounts of phase shift φ are 90 degrees. The amounts of phase shift φ are adjusted by shifting in time the timing of the fall and rise of the pulse signals input to the switching elements S3 and S4 with respect to the timing of the rise and fall of the pulse signals input to the switching elements S1 and S2. When the amounts of phase shift φ are changed, the output time ratio of the voltage V (i.e., the ratio of a period during which a non-zero value is taken to one period) changes. The closer to 0 degrees the amounts of phase shift φ are, the higher the output time ratio of the voltage V becomes. The closer to 180 degrees the amounts of phase shift φ are, the lower the output time ratio of the voltage V becomes. The voltage V output from the inverter circuit 130 may be converted into a sine-wave voltage by using a smoothing circuit (not illustrated) and supplied to the power transmitting antenna 140. The amplitude of the sine-wave voltage changes in accordance with the output time ratio. Accordingly, by changing the amounts of phase shift φ, it is possible to change the time average value of the amplitude of the alternating-current voltage input to the power transmitting antenna 140.

Figure 9:
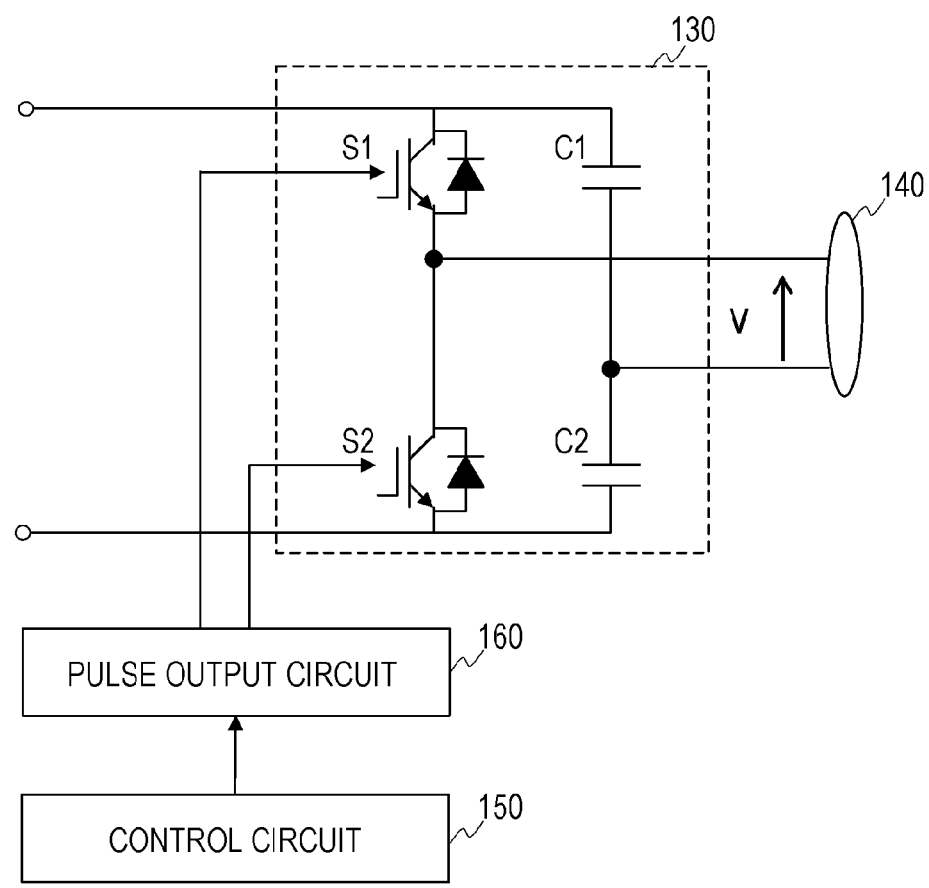
FIG. 9 is a diagram illustrating another example configuration of the power-transmitting-side inverter circuit.

FIG. 9 is a diagram illustrating another example configuration of the inverter circuit 130. In the illustrated example, the inverter circuit 130 is a half-bridge inverter circuit. The phase control described above is not applicable when a half-bridge inverter circuit is used. In this case, the duty ratio of pulse signals input to individual switching elements can be changed to control the time average value of the amplitude of the voltage.

The inverter circuit 130 illustrated in FIG. 9 is a half-bridge inverter circuit including two switching elements S1 and S2 and two capacitors C1 and C2. The two switching elements S1 and S2 are connected in parallel to the two capacitors C1 and C2. One end of the power transmitting antenna 140 is connected to a node between the two switching elements S1 and S2, and the other end of the power transmitting antenna 140 is connected to a node between the two capacitors C1 and C2.

The control circuit 150 and the pulse output circuit 160 supply pulse signals to the switching elements S1 and S2 so that the switching elements S1 and S2 are alternately turned on. The direct-current power is converted into alternating-current power accordingly.

In the illustrated example, the duty ratio of the pulse signals (i.e., the ratio of a turn-on period to one period) can be adjusted to adjust the output time ratio of the output voltage V. Thus, the alternating-current power input to the power transmitting antenna 140 can be adjusted.

Figure 10A:
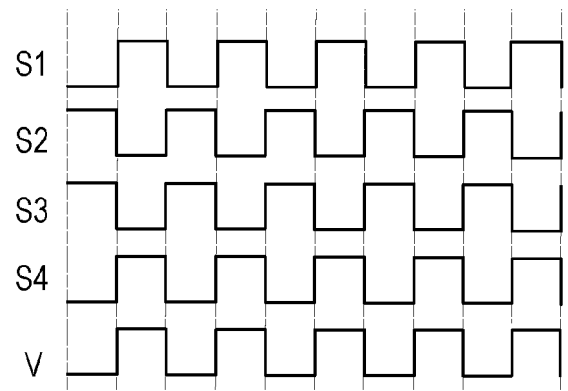
FIG. 10A is a diagram illustrating example waveforms of pulse signals input to switching elements of the power-transmitting-side inverter circuit and the output voltage when the pulse signals have a duty ratio of 0.5 (50%)
Figure 10B:
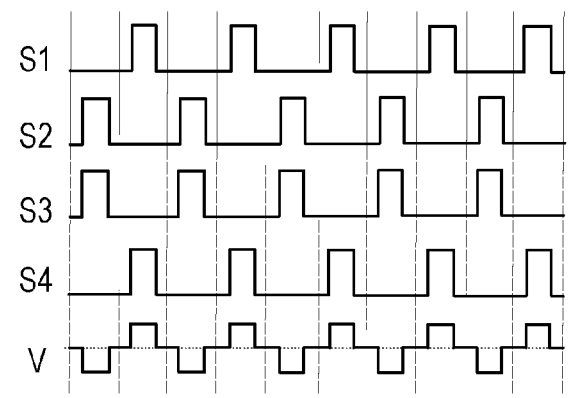
FIG. 10B is a diagram illustrating example waveforms of the pulse signals input to the switching elements of the power-transmitting-side inverter circuit and the output voltage when the pulse signals have a duty ratio of 0.25 (25%)

FIGS. 10A and 10B are diagrams illustrating duty control. FIG. 10A illustrates example waveforms of pulse signals input to the switching elements S1 to S4 and the output voltage V when the pulse signals have a duty ratio of 0.5 (50%). FIG. 10B illustrates example waveforms of pulse signals input to the switching elements S1 to S4 and the output voltage V when the pulse signals have a duty ratio of 0.25 (25%). As illustrated in FIGS. 10A and 10B, by changing the duty ratio, it is possible to change the output time ratio of the voltage V (i.e., the ratio of a period during which a non-zero value is taken to one period). Thus, the amplitude of the voltage of the alternating-current power received by the power receiving antenna 210 can be changed. Such pulse signals having different duty ratios are generated by the pulse output circuit 160 which includes, for example, a PWM control circuit. The duty ratio is adjusted in the range of 0% to 50%. The amplitude of the power transmitting voltage is maximum when the duty ratio is 50%, and the amplitude of the power transmitting voltage is minimum when the duty ratio is 0%. The duty control described above is also applicable when the full-bridge inverter circuit illustrated in FIG. 7 is used.

The method described above allows the control circuit 150 to adjust the level of the voltage of the alternating-current power output from the inverter circuit 130. Similar control is also applicable to the relay-side inverter circuit 230 in the relay-side power transmitting circuit 201 in a similar way.

Next, an example fault diagnosis operation according to this embodiment will be described.

Figure 11A:
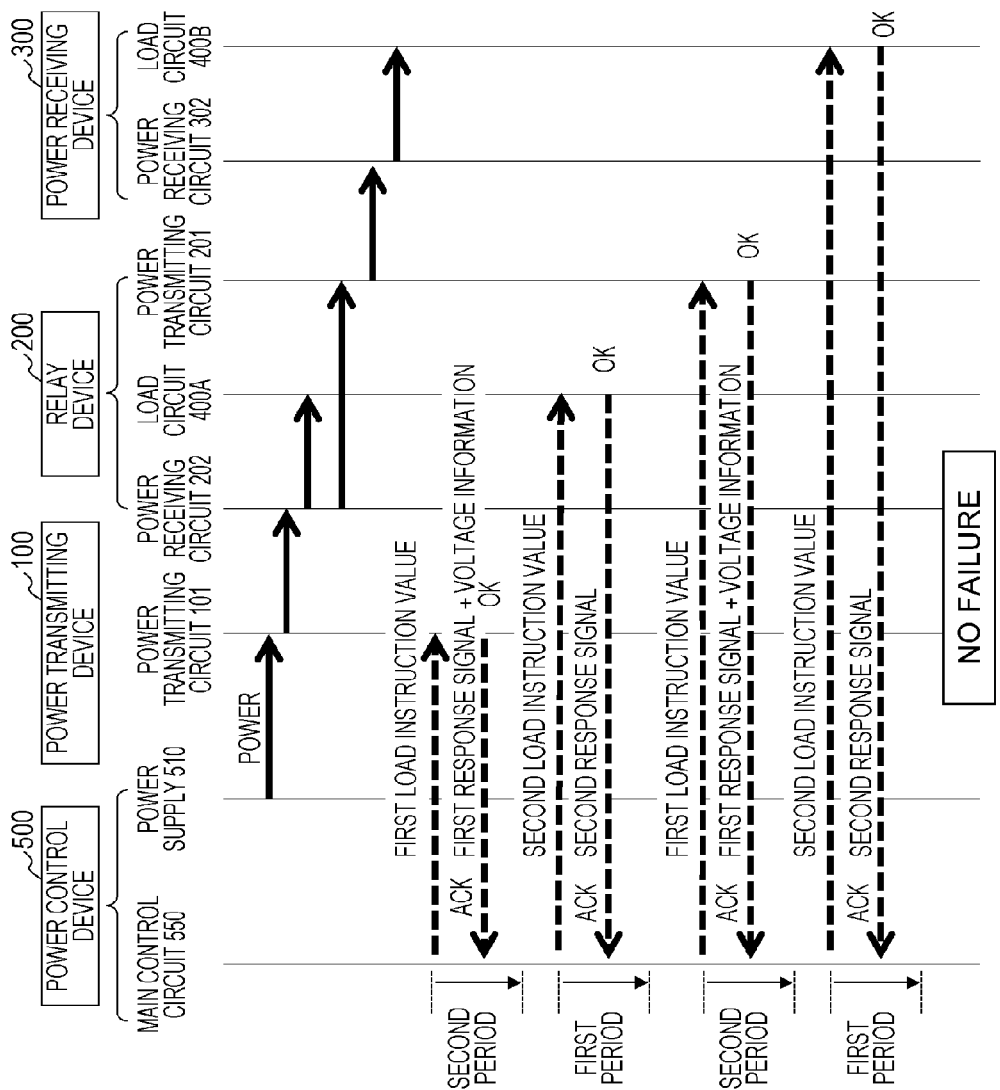
FIG. 11A is a sequence diagram illustrating an example operation according to the first embodiment when no failure has occurred.

FIG. 11A is a sequence diagram illustrating an example operation according to this embodiment when no failure has occurred. In FIG. 11A, the solid line indicates the flow of power and the broken line indicates the flow of signals. In the illustrated example, since no failure has occurred, power is correctly transmitted from the direct-current power supply 510 to all of the power-transmitting-side power transmitting circuit 101, the relay-side power receiving circuit 202, the relay-side load circuit 400A, the relay-side power transmitting circuit 201, the power-receiving-side power receiving circuit 302, and the power-receiving-side load circuit 400B. The main control circuit 550 in the power control device 500 transmits a first load instruction value to the power-transmitting-side power transmitting circuit 101. Upon receipt of the first load instruction value, the power-transmitting-side power transmitting circuit 101 transmits a response signal (ACK) including a first response signal and voltage information of the relay-side direct-current power. Since the power-transmitting-side power transmitting circuit 101 has no failure, the main control circuit 550 receives the ACK within a second period (for example, several seconds to several tens of seconds) after the transmission of the first load instruction value. The main control circuit 550 further transmits a second load instruction value to the relay-side load circuit 400A. Upon receipt of the second load instruction value, the relay-side load circuit 400A transmits a second response signal (ACK). Since no failure exists, the main control circuit 550 receives the ACK within a first period (for example, several seconds to several tens of seconds) after the transmission of the second load instruction value. Similar operation is also performed for the relay-side power transmitting circuit 201 and the power-receiving-side load circuit 400B.

Figure 11B:
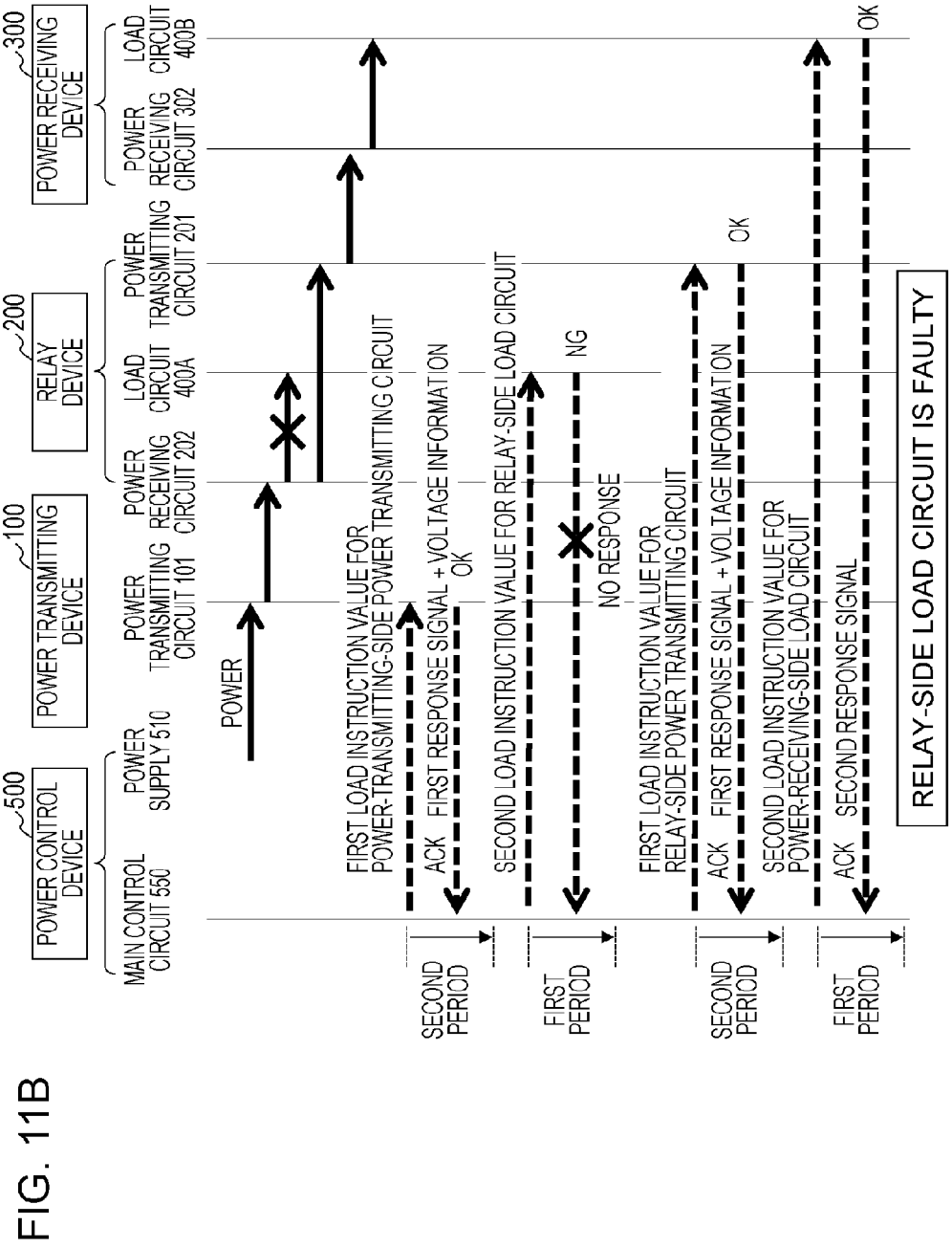
FIG. 11B is a sequence diagram illustrating an example operation according to the first embodiment when a relay-side load circuit is faulty.

FIG. 11B is a sequence diagram illustrating an example operation when the relay-side load circuit 400A is faulty. In the illustrated example, since the relay-side load circuit 400A is faulty, power is not correctly supplied to the relay-side load circuit 400A, whereas power is correctly supplied to the power-transmitting-side power transmitting circuit 101, the relay-side power receiving circuit 202, the relay-side power transmitting circuit 201, the power-receiving-side power receiving circuit 302, and the power-receiving-side load circuit 400B. The main control circuit 550 in the power control device 500 transmits a first load instruction value to the power-transmitting-side power transmitting circuit 101. Upon receipt of the first load instruction value, the power-transmitting-side power transmitting circuit 101 transmits a response signal (ACK) including a first response signal and voltage information of the relay-side direct-current power. Since the power-transmitting-side power transmitting circuit 101 has no failure, the main control circuit 550 receives the ACK within a second period (for example, several seconds to several tens of seconds) after the transmission of the first load instruction value. The main control circuit 550 further transmits a second load instruction value to the relay-side load circuit 400A. Due to the fault, the relay-side load circuit 400A is not capable of transmitting a second response signal (ACK) to the second load instruction value. Thus, the main control circuit 550 fails to receive a second response signal until the first period has elapsed since the transmission of the second load instruction value.

In this situation, it is difficult to determine in the comparative example illustrated in FIG. 3 which of the relay-side load circuit 400A and the relay-side power receiving circuit 202 is faulty. In the illustrated example, in contrast, since voltage information has been successfully received from the power-transmitting-side power transmitting circuit 101 within the second period, the main control circuit 550 can determine that not the relay-side power receiving circuit 202 but the relay-side load circuit 400A is faulty.

In the illustrated example, none of the relay-side power transmitting circuit 201, the power-receiving-side power receiving circuit 302, and the power-receiving-side load circuit 400B has experienced failure. Thus, the main control circuit 550 receives a first response signal and voltage information from the relay-side power transmitting circuit 201 within the second period and receives a second response signal from the power-receiving-side load circuit 400B within the first period.

Figure 11C:
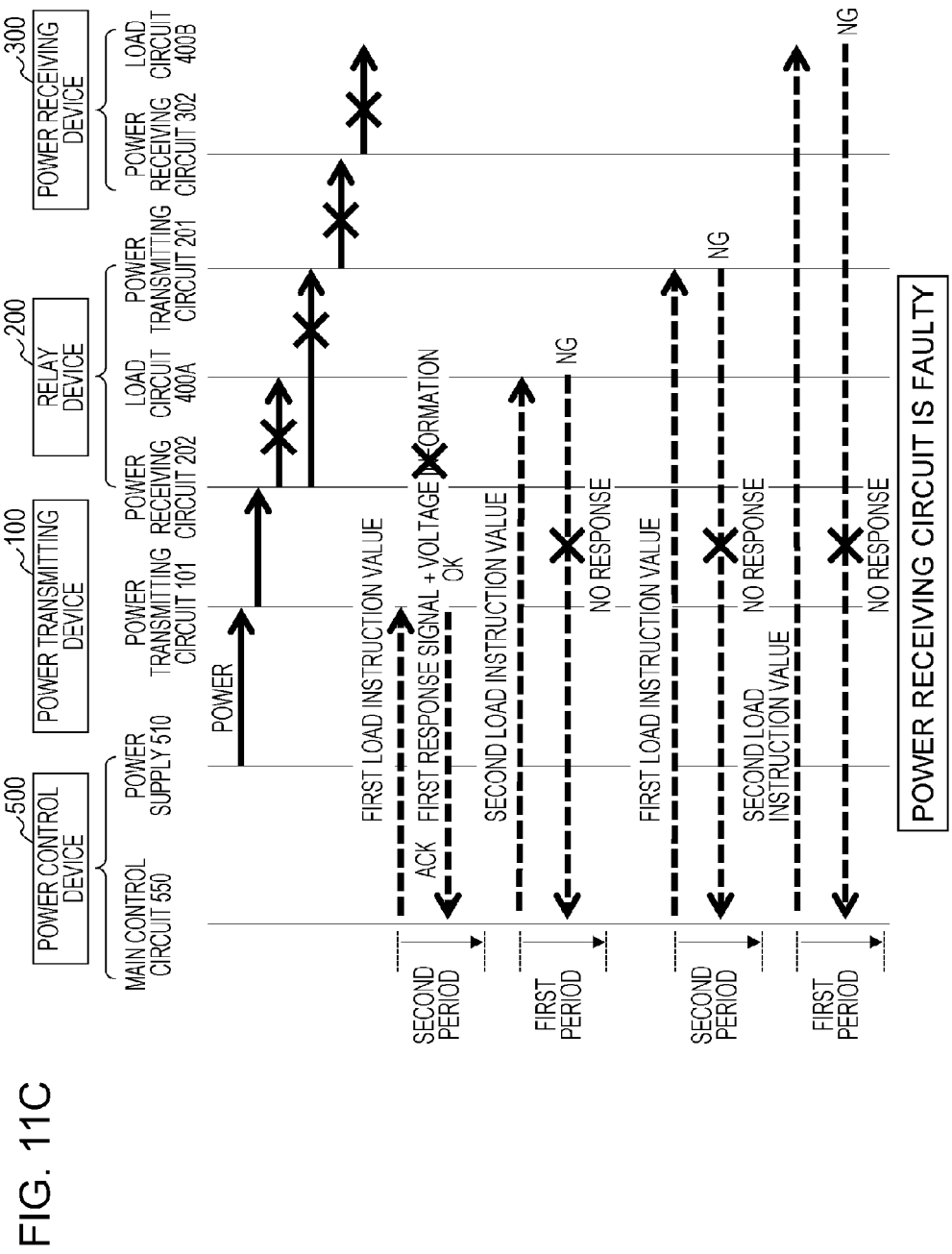
FIG. 11C is a sequence diagram illustrating an example operation according to the first embodiment when a relay-side power receiving circuit is faulty.

FIG. 11C is a sequence diagram illustrating an example operation when the relay-side power receiving circuit 202 is faulty. In the illustrated example, since the relay-side power receiving circuit 202 is faulty, no power is supplied to the components located downstream of the relay-side power receiving circuit 202, namely, the relay-side load circuit 400A, the relay-side power transmitting circuit 201, the power-receiving-side power receiving circuit 302, and the power-receiving-side load circuit 400B. The main control circuit 550 transmits a first load instruction value to the power-transmitting-side power transmitting circuit 101. Upon receipt of the first load instruction value, the power-transmitting-side power transmitting circuit 101 attempts to transmit a response signal (ACK) including a first response signal and voltage information of the relay-side direct-current power. However, since the relay-side power receiving circuit 202 is faulty, the latest voltage information is not provided from the relay-side power receiving circuit 202 to the power-transmitting-side power transmitting circuit 101. In this case, the power-transmitting-side power transmitting circuit 101 transmits only a first response signal to the main control circuit 550. The main control circuit 550 further transmits a second load instruction value to the relay-side load circuit 400A. However, since no power is supplied to the relay-side load circuit 400A, the main control circuit 550 does not receive a second response signal within the first period. In this case, the main control circuit 550 determines that not the relay-side load circuit 400A but the relay-side power receiving circuit 202 is faulty.

Figure 12:
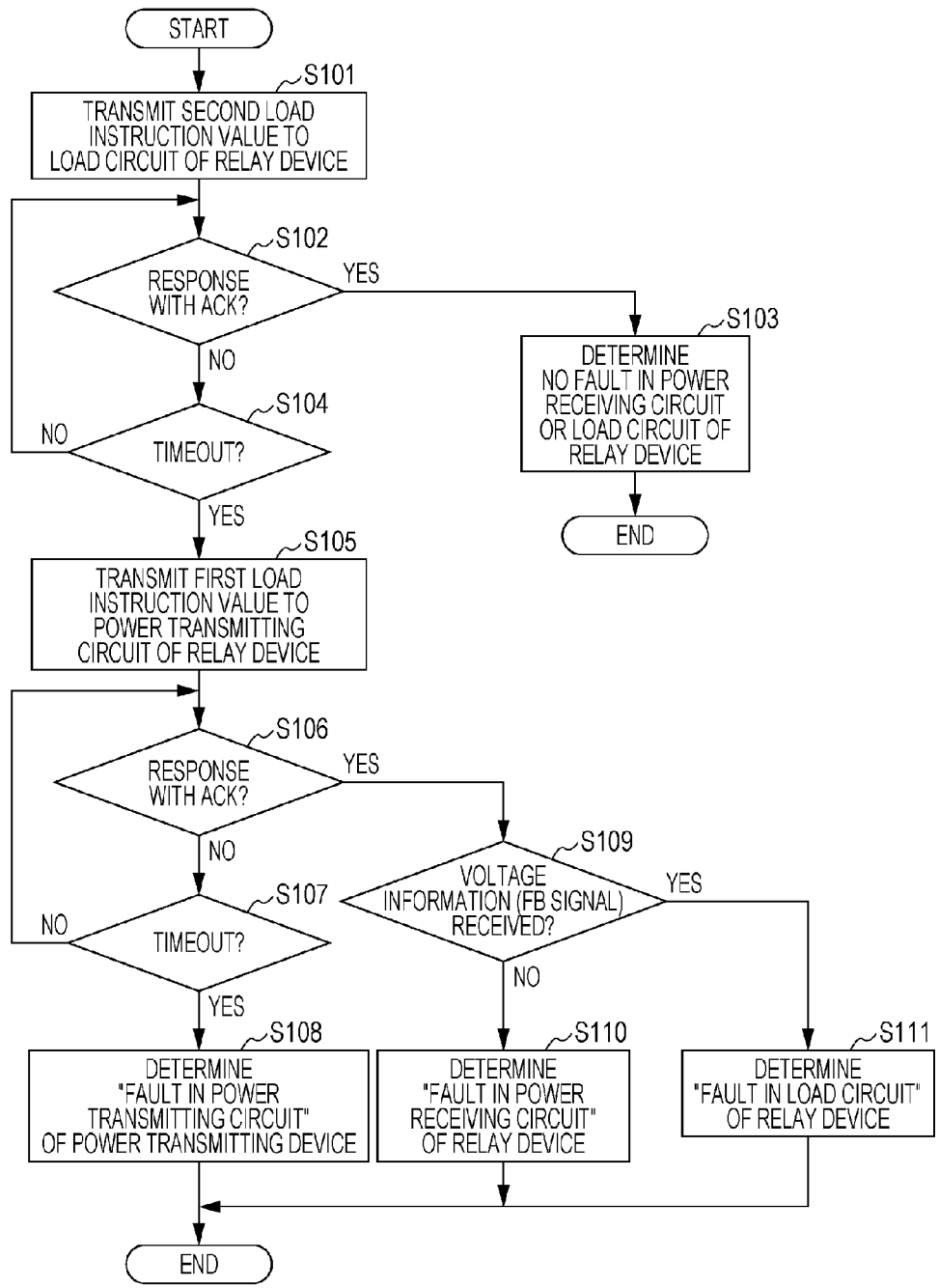
FIG. 12 is a flowchart illustrating an example operation of a main control circuit of a power control device according to the first embodiment.

FIG. 12 is a flowchart illustrating an example operation of the main control circuit 550 of the power control device 500 according to this embodiment. The main control circuit 550 executes a computer program stored in a memory to implement the illustrated operation. First, the main control circuit 550 transmits a second load instruction value to the load circuit 400A of the relay device 200 (step S101). Then, the main control circuit 550 determines whether a second response signal (ACK) to the second load instruction value has been transmitted (step S102). If an ACK has been transmitted, the main control circuit 550 determines that none of the power receiving circuit 202 and the load circuit 400A of the relay device 200 is faulty (step S103). If no ACK has been transmitted, the main control circuit 550 determines whether or not a timeout has occurred, that is, whether a first period has elapsed (step S104). If a timeout has not occurred, the main control circuit 550 waits for the transmission of an ACK until the first period elapses. If a timeout has occurred, the main control circuit 550 transmits a first load instruction value to the power transmitting circuit 101 of the power transmitting device 100 (step S105). Then, the main control circuit 550 determines whether a first response signal to the first load instruction value and voltage information (ACK) have been transmitted (step S106). If no ACK has been transmitted, the main control circuit 550 determines whether or not a timeout has occurred, that is, whether a second period has elapsed (step S107). If a timeout has not occurred, the main control circuit 550 waits for the transmission of an ACK until the second period elapses. If a timeout has occurred, the main control circuit 550 determines that the power transmitting circuit 101 of the power transmitting device 100 is faulty (step S108).

If it is determined in step S106 that an ACK to the first load instruction value has been received, the main control circuit 550 determines whether voltage information (FB signal) has been received (step S109). If no voltage information has been received, the main control circuit 550 determines that the power receiving circuit 202 of the relay device 200 is faulty (step S110). If voltage information has been received, the main control circuit 550 determines that the load circuit 400A of the relay device 200 is faulty (step S111).

In the illustrated example, the transmission of a second load instruction value is followed by the transmission of a first load instruction value. The order of these values may be reversed, or the first load instruction value and the second load instruction value may be transmitted simultaneously. The operation illustrated in FIGS. 11A to 11O and FIG. 12 is also applicable to the determination of fault in the power receiving circuit 302 and the load circuit 400B in the power receiving device 300 in a similar way.

In this embodiment, as described above, if no second response signal is received from the load circuit 400A within a first period after the transmission of a second load instruction value and if a first response signal is received from the power-transmitting-side power transmitting circuit 101 but voltage information of the relay-side direct-current power is not received within a second period after the transmission of a first load instruction value, the main control circuit 550 determines that not the load circuit 400A but the relay-side power receiving circuit 202 is faulty. In this case, the main control circuit 550 outputs a control signal indicating that the relay-side power receiving circuit 202 is faulty to the display 590. On the other hand, if no second response signal is received from the load circuit 400A within a first period and if a first response signal is received from the power transmitting device 100 and voltage value of the relay-side direct-current power is received within a second period, the main control circuit 550 determines that not the relay-side power receiving circuit 202 but the load circuit 400A is faulty. In this case, the main control circuit 550 outputs a control signal indicating that the load circuit 400A is faulty to the display 590.

The main control circuit 550 can diagnose a fault in the power-receiving-side power receiving circuit 302 and the load circuit 400B by using a similar method. If no second response signal is received from the load circuit 400B within a first period and if a first response signal is received from the relay-side power transmitting circuit 201 but power-receiving-side voltage information of the direct-current power is not received within a second period, the main control circuit 550 determines that not the load circuit 400B but the power-receiving-side power receiving circuit 302 is faulty. In this case, the main control circuit 550 outputs a control signal indicating that the power-receiving-side power receiving circuit 302 is faulty to the display 590. On the other hand, if no second response signal is received from the load circuit 400B within a first period and if a first response signal is received from the relay-side power transmitting circuit 201 and a voltage value of the power-receiving-side direct-current power is received within a second period, the main control circuit 550 determines that not the power-receiving-side power receiving circuit 302 but the load circuit 400B is faulty. In this case, the main control circuit 550 outputs a control signal indicating that the load circuit 400B is faulty to the display 590.

Upon receipt of the control signal, the display 590 displays an indication that the relay-side power receiving circuit 202, the load circuit 400A, the power-receiving-side power receiving circuit 302, or the load circuit 400B is faulty. This allows a user (for example, the manager of the wireless power transmission system) to promptly recognize the location of the fault on the basis of the indication on the display 590. The control signal may include not only information indicating that a specific circuit is faulty but also image information that provides a visual representation of portions that are in normal operation and portions that are malfunctioning in the overall system.

In the manner described above, according to this embodiment, upon receipt of a first load instruction value, the power-transmitting-side control circuit 150 transmits to the power control device 500, in addition to a first response signal, voltage information indicating the voltage value of the relay-side direct-current power received from the relay-side power receiving circuit 202. Thus, if no second response signal has been received from the load circuit 400A within a first period and if a first response signal has been received from the power transmitting device 100, the main control circuit 550 can identify which of the load circuit 400A and the relay-side power receiving circuit 202 is faulty in accordance with whether or not voltage information of the relay-side direct-current power has been received.

Likewise, upon receipt of a first load instruction value, the relay-side control circuit 250 transmits to the power control device 500, in addition to a first response signal, voltage information indicating the voltage value of the power-receiving-side direct-current power received from the power-receiving-side power receiving circuit 302. Thus, if no second response signal has been received from the load circuit 400B within a first period and if a first response signal has received from the relay-side power transmitting circuit 201, the main control circuit 550 can identify which of the load circuit 400B and the power-receiving-side power receiving circuit 302 is faulty in accordance with whether or not voltage information of the power-receiving-side direct-current power has been received.

Second Embodiment

Next, a wireless power transmission system according to a second embodiment of the present disclosure will be described. The wireless power transmission system according to this embodiment is different from that of the first embodiment in that two or more relay devices 200 are provided between the power transmitting device 100 and the power receiving device 300. In the following, the configuration and operation of the wireless power transmission system according to this embodiment will be described focusing on the difference from the difference from the first embodiment.

Figure 13:
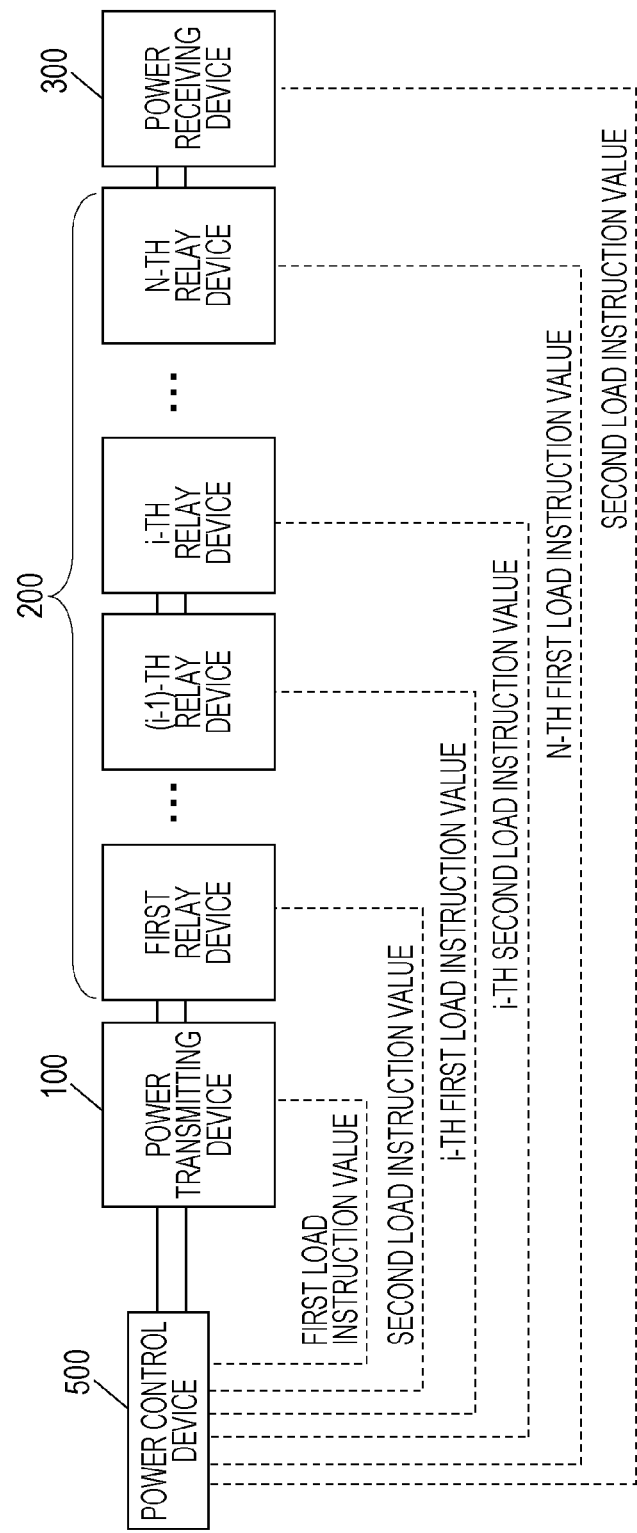
FIG. 13 is a diagram illustrating a schematic configuration of a wireless power transmission system according to a second embodiment of the present disclosure.

FIG. 13 is a diagram illustrating a schematic configuration of the wireless power transmission system according to this embodiment. FIG. 13 illustrates an example configuration in which N relay devices 200 (where N is an integer greater than or equal to 2) are arranged between the power transmitting device 100 and the power receiving device 300. The illustrated configuration may be effective when a wireless power transmission system disclosed herein is applied to a device having multiple movable units, such as the robot arm illustrated in FIG. 1. The N relay devices 200 in turn relay alternating-current power transmitted wirelessly from the power transmitting device 100 to the power receiving device 300. The power control device 500 transmits a first load instruction value to the power transmitting device 100 and the respective power transmitting circuits in the N relay devices 200, and transmits a second load instruction value to the respective load circuits in the N relay devices 200. This configuration allows fault diagnosis similar to that in the first embodiment to be performed between the power transmitting device 100 and the first relay device 200 among the N relay devices 200, between two adjacent relay devices 200, and between the N-th relay device 200 and the power receiving device 300.

Figure 14:
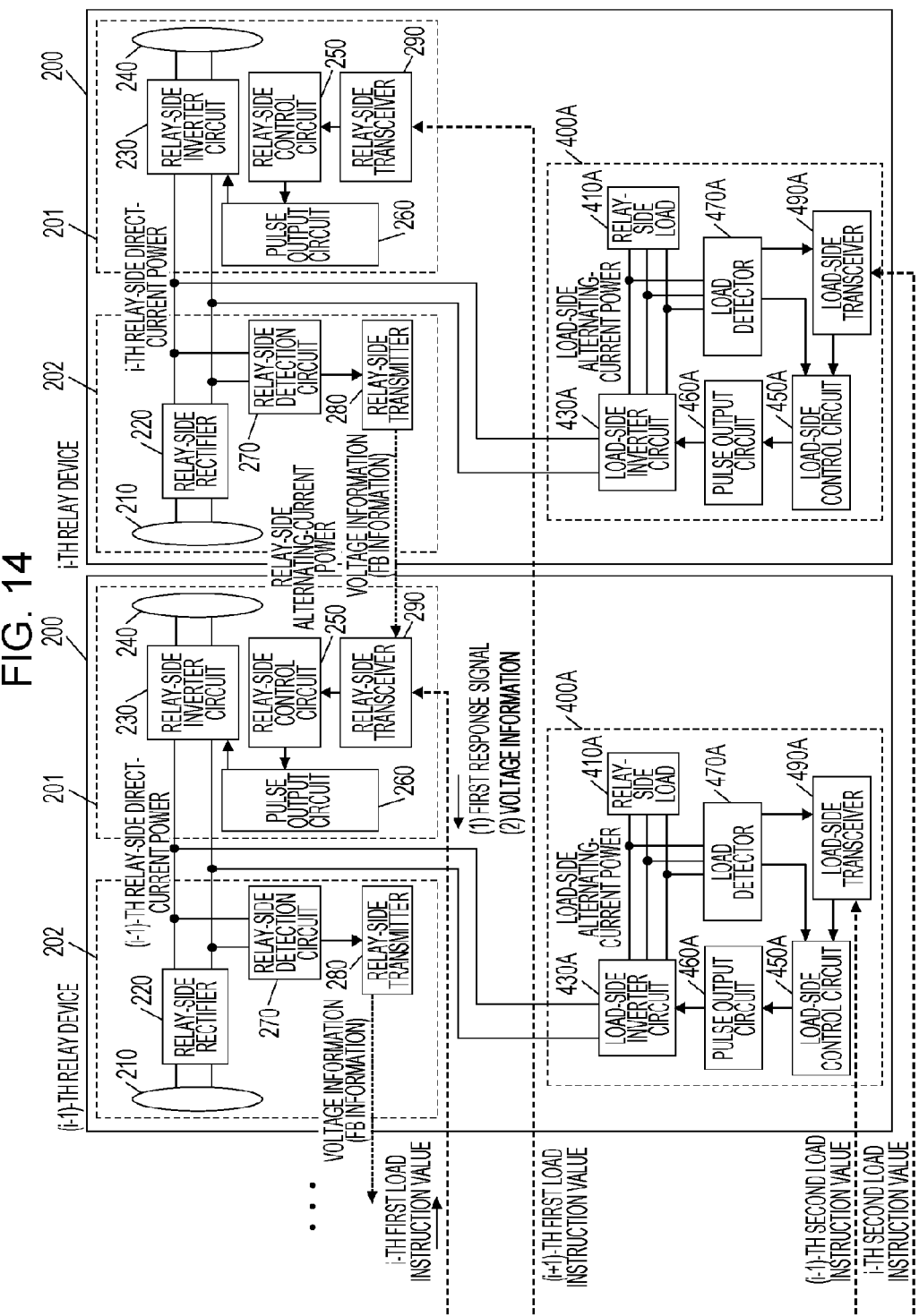
FIG. 14 is a block diagram illustrating the configuration of the wireless power transmission system according to the second embodiment.

FIG. 14 is a block diagram illustrating the configuration of the wireless power transmission system according to this embodiment. The wireless power transmission system according to this embodiment includes a power control device 500 that provides direct-current power, a power transmitting device 100 that converts the direct-current power into power-transmitting-side alternating-current power and transmits the power-transmitting-side alternating-current power, N relay devices 200 (where N is an integer greater than or equal to 2) that convert the power-transmitting-side alternating-current power into relay-side alternating-current power and transmit the relay-side alternating-current power, and a power receiving device 300 that receives the relay-side alternating-current power. In FIG. 14, the (i−1)-th relay device 200 and the i-th relay device 200 (where i is an integer greater than or equal to 2 and less than or equal to N), which are adjacent to each other, among the N relay devices 200 are illustrated by way of example. The power control device 500, the power transmitting device 100, and the power receiving device 300 have each a configuration similar to that in the first embodiment (FIG.

4). Each of the N relay devices 200 has a configuration similar to that of the relay device 200 in the first embodiment.

The main control circuit 550 in the power control device 500 transmits the i-th first load instruction value to the power transmitting circuit 201 in the (i−1)-th relay device 200, and transmits the i-th second load instruction value to the load circuit 400A in the i-th relay device 200. The relay-side transceiver 290 in the (i−1)-th relay device 200 transmits a response (a first response signal and voltage information) to the i-th first load instruction value to the main control circuit 550. The load-side transceiver 490A in the i-th relay device 200 transmits a response (a second response signal) to the i-th second load instruction value to the main control circuit 550. The main control circuit 550 can identify which of the power receiving circuit 202 and the load circuit 400A in the i-th relay device 200 is faulty in accordance with the reception state of the first response signal, the voltage information, and the second response signal. The determination of a fault in the power receiving circuit 202 and the load circuit 400A in the first relay device 200 and the determination of a fault in the power receiving circuit 302 and the load circuit 400B in the power receiving device 300 are also feasible by using a method similar to that in the first embodiment. The determination of a fault in the power receiving circuit 202 and the load circuit 400A in the first relay device 200 is based on the reception state of a first response signal and voltage information from the power transmitting circuit 101 in the power transmitting device 100 and a second response signal from the load circuit 400A in the first relay device 200. The determination of a fault in the power receiving circuit 302 and the load circuit 400B in the power receiving device 300 is based on the reception state of a first response signal and voltage information from the power transmitting circuit 201 in the N-th relay device 200 and a second response signal from the load circuit 400B in the power receiving device 300.

This configuration allows a wireless power transmission system including N relay devices 200 to also identify which of the power receiving circuit 202 and the load circuit 400A in the i-th relay device 200 (i=2 to N) has failed.

Figure 15A:
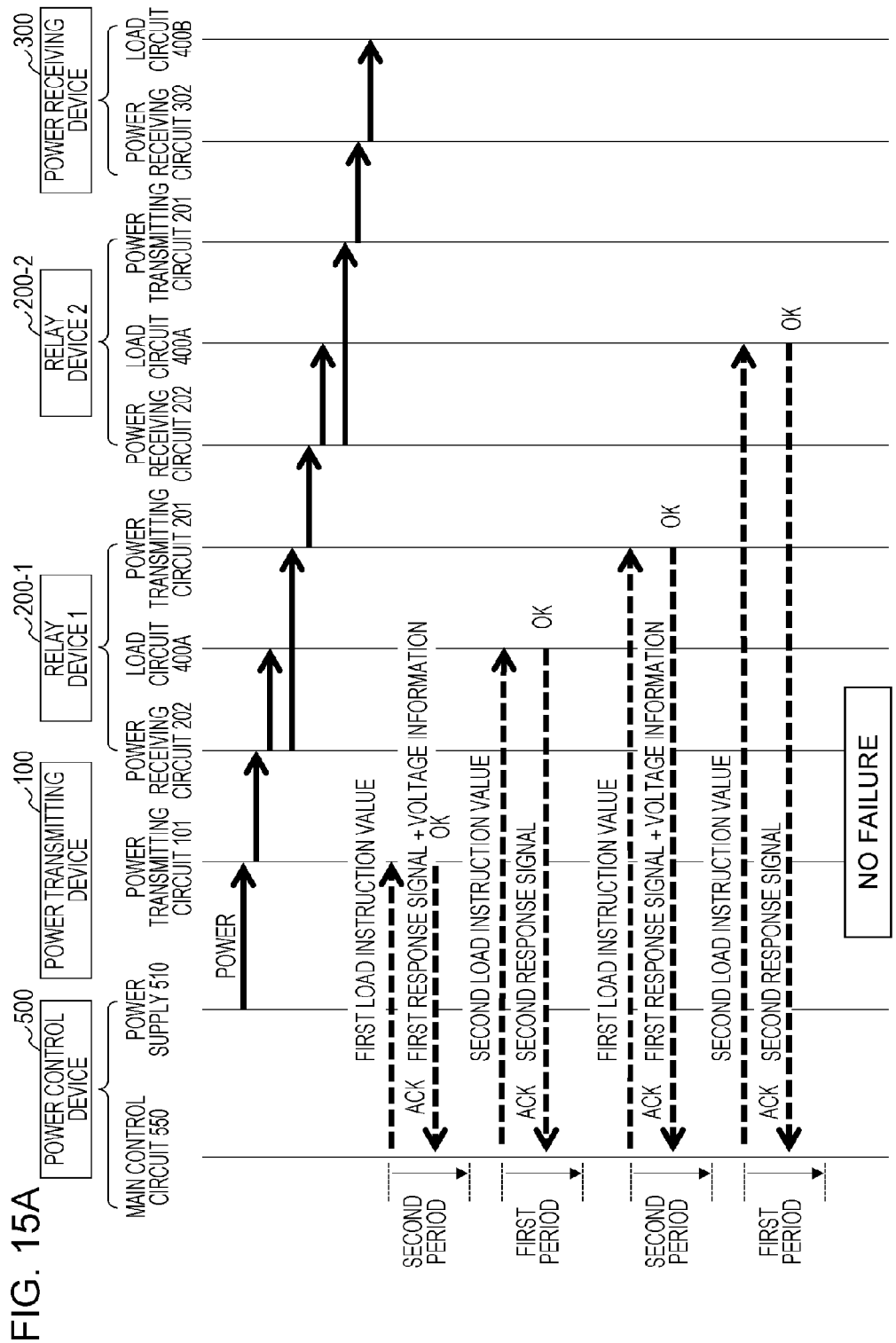
FIG. 15A is a sequence diagram illustrating an example operation according to the second embodiment when no failure has occurred.
Figure 15B:
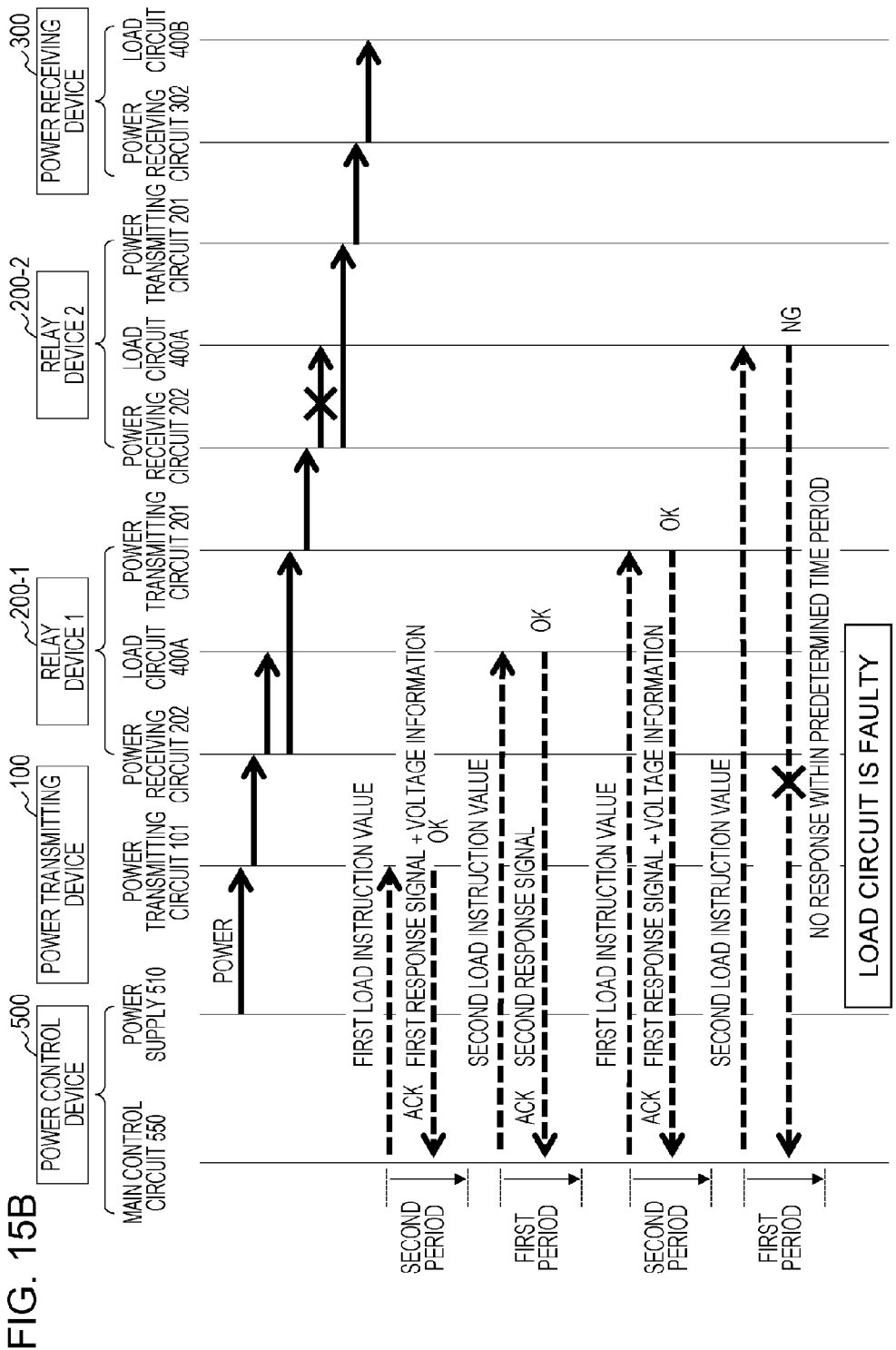
FIG. 15B is a sequence diagram illustrating an example operation according to the second embodiment when a relay-side load circuit in a relay device is faulty.
Figure 15C:
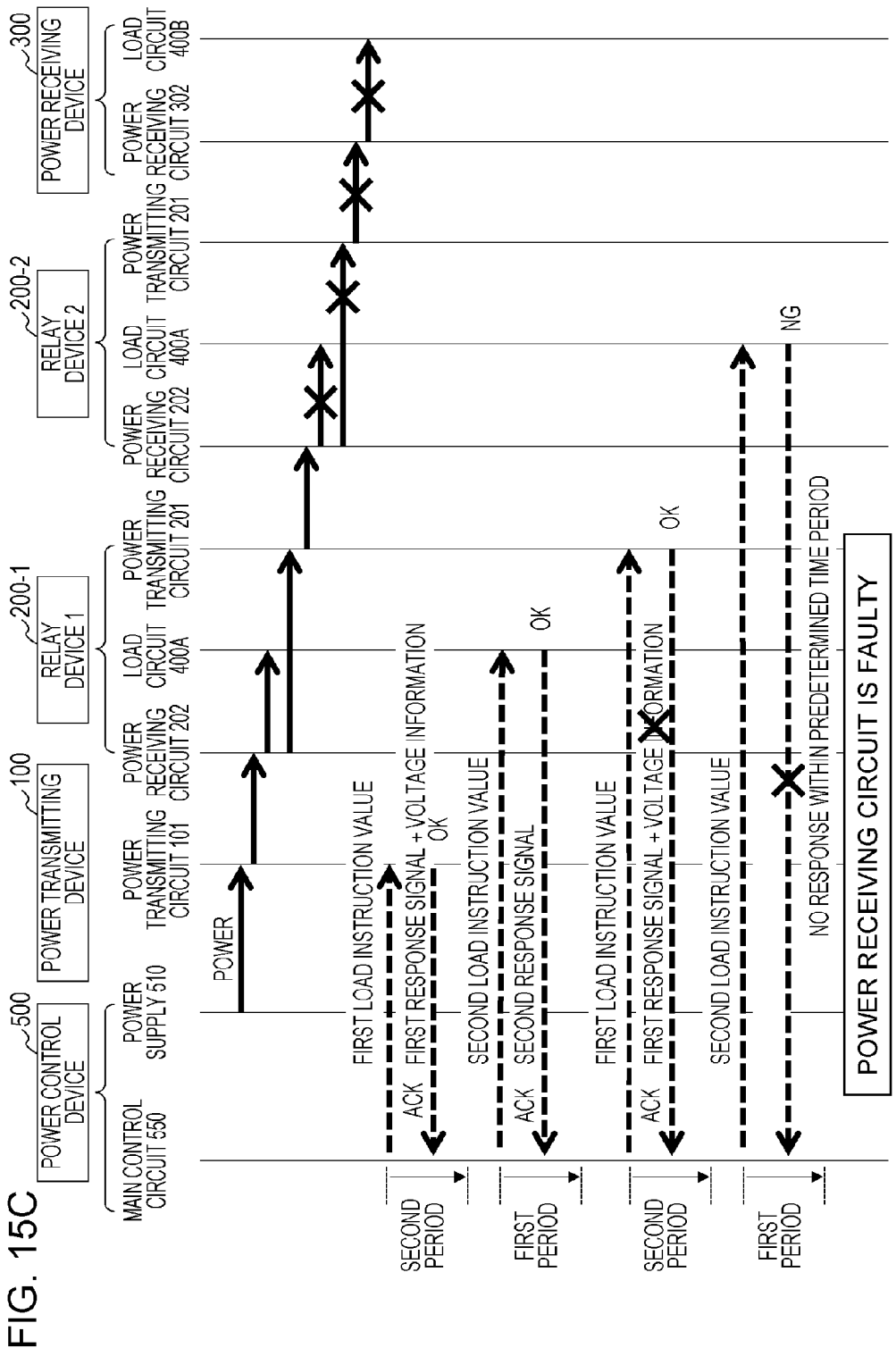
FIG. 15C is a sequence diagram illustrating an example operation according to the second embodiment when a relay-side power receiving circuit in the relay device is faulty.

An example fault diagnosis operation according to this embodiment will now be described with reference to FIGS. 15A to 15C and FIG. 16. In FIGS. 15A to 15C, an example of a wireless power transmission system including two relay devices 200 (e.g., relay device 1 and relay device 2, hereinafter referred to as the "relay device 200-1" and the "relay device 200-2", respectively) is illustrated for simplicity. The following operation is also applicable to the case of three or more relay devices 200 in a similar way.

FIG. 15A is a sequence diagram illustrating an example operation according to this embodiment when no failure has occurred. In the illustrated example, since no failure has occurred, power is correctly transmitted from the direct-current power supply 510 to all of the power transmitting circuits 101 and 201, the power receiving circuits 202 and 302, and the load circuits 400A and 400B of the power transmitting device 100, the relay device 200-1, the relay device 200-2, and the power receiving device 300. The main control circuit 550 transmits a first load instruction value to each of the power-transmitting-side power transmitting circuit 101 and the respective relay-side power transmitting circuits 201. Upon receipt of the first load instruction value, each of the power-transmitting-side power transmitting circuit 101 and the respective relay-side power transmitting circuits 201 transmits a response signal (ACK) including a first response signal and voltage information. In the illustrated example, none of the circuits has experienced failure. Thus, the main control circuit 550 receives the ACKs within a second period (for example, several seconds to several tens of seconds) after the transmission of the first load instruction value. The main control circuit 550 further transmits a second load instruction value to each of the respective relay-side load circuits 400A and the power-receiving-side load circuit 400B. Upon receipt of the second load instruction value, each of the respective relay-side load circuits 400A and the power-receiving-side load circuit 400B transmits a second response signal (ACK). Since no failure exists, the main control circuit 550 receives the ACKs within a first period (for example, several seconds to several tens of seconds) after the transmission of the second load instruction value.

FIG. 15B is a sequence diagram illustrating an example operation when the relay-side load circuit 400A in the relay device 200-2 is faulty. In the illustrated example, since the relay-side load circuit 400A in the relay device 200-2 is faulty, power is not correctly supplied to the relay-side load circuit 400A in the relay device 200-2, whereas power is correctly supplied to the relay-side power receiving circuit 202 and the relay-side power transmitting circuit 201 in the relay device 200-2 and the power-receiving-side power receiving circuit 302 and the power-receiving-side load circuit 400B in the power receiving device 300. The main control circuit 550 transmits a first load instruction value to each of the power-transmitting-side power transmitting circuit 101 and the respective relay-side power transmitting circuits 201. Upon receipt of the first load instruction value, each of the power-transmitting-side power transmitting circuit 101 and the respective relay-side power transmitting circuits 201 transmits a response signal (ACK) including a first response signal and voltage information of the relay-side direct-current power. In the illustrated example, since no components other than the load circuit 400A of the relay device 200-2 have experienced failure, the main control circuit 550 receives the ACKs within a second period (for example, several seconds to several tens of seconds) after the transmission of the first load instruction value. The main control circuit 550 further transmits a second load instruction value to each of the respective relay-side load circuits 400A and the power-receiving-side load circuit 400B. Each of the relay-side load circuit 400A in the relay device 200-1 and the power-receiving-side load circuit 400B in the power receiving device 300 transmits a second response signal (ACK) to the second load instruction value. On the other hand, due to the fault, the relay-side load circuit 400A in the relay device 200-2 is not capable of transmitting a second response signal (ACK) to the second load instruction value. Thus, the main control circuit 550 fails to receive a second response signal from the relay-side load circuit 400A in the relay device 200-2 within the second period.

In this situation, it is difficult to determine in the comparative example illustrated in FIG. 3 which of the relay-side load circuits 400A and the relay-side power receiving circuits 202 is faulty. In the illustrated example, in contrast, since voltage information has been successfully received from the relay device 200-1 within the second period, the main control circuit 550 can determine that not the relay-side power receiving circuit 202 in the relay device 200-2 but the relay-side load circuit 400A in the relay device 200-2 is faulty.

FIG. 15C is a sequence diagram illustrating an example operation when the relay-side power receiving circuit 202 in the relay device 200-2 is faulty. In the illustrated example, since the relay-side power receiving circuit 202 in the relay device 200-2 is faulty, no power is supplied to the components located downstream of the relay-side power receiving circuit 202 in the relay device 200-2, namely, the relay-side load circuit 400A and the relay-side power transmitting circuit 201 in the relay device 200-2, the power-receiving-side power receiving circuit 302, and the power-receiving-side load circuit 400B. The main control circuit 550 transmits a first load instruction value to each of the power-transmitting-side power transmitting circuit 101 and the respective relay-side power transmitting circuits 201. Upon receipt of the first load instruction value, the power-transmitting-side power transmitting circuit 101 transmits a response signal (ACK) including a first response signal and voltage information of the relay-side direct-current power. On the other hand, upon receipt of the first load instruction value, the relay-side power transmitting circuit 201 in the relay device 200-1 attempts to transmit a response signal (ACK) including a first response signal and voltage information of the relay-side direct-current power. However, since the relay-side power receiving circuit 202 of the relay device 200-2 is faulty, the latest voltage information is not provided to the relay-side power transmitting circuit 201 of the relay device 200-1. In this case, the relay-side power transmitting circuit 201 in the relay device 200-1 transmits only a first response signal to the main control circuit 550. The main control circuit 550 further transmits a second load instruction value to the relay-side load circuit 400A of the relay device 200-2. However, since no power is supplied to the relay-side load circuit 400A, the main control circuit 550 does not receive a second response signal within the first period. In this case, the main control circuit 550 determines that not the relay-side load circuit 400A in the relay device 200-2 but the relay-side power receiving circuit 202 in the relay device 200-2 is faulty.

Figure 16:
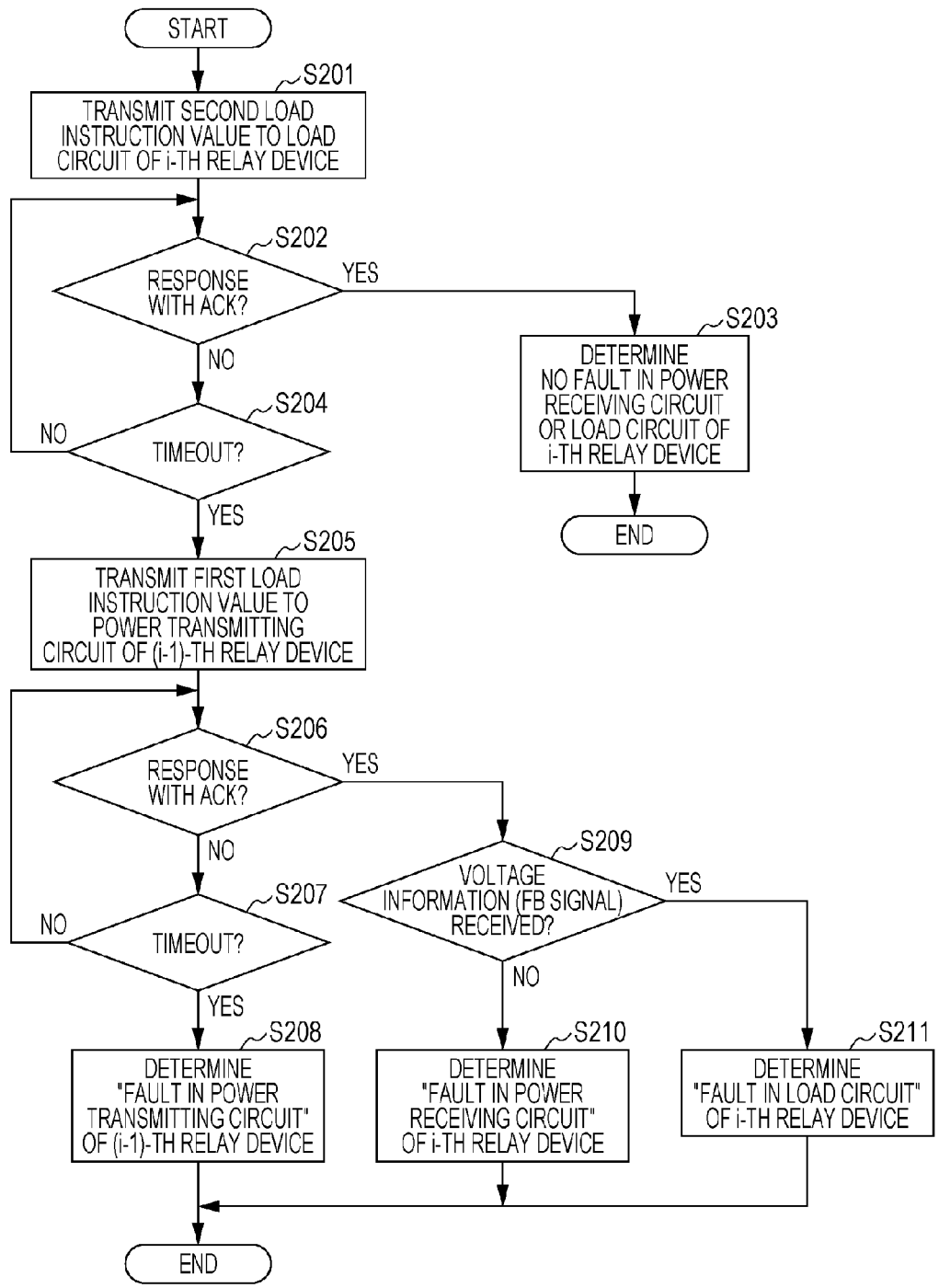
FIG. 16 is a flowchart illustrating an example operation of the main control circuit according to the second embodiment.

FIG. 16 is a flowchart illustrating an example operation of the main control circuit 550 according to this embodiment. The main control circuit 550 executes a computer program stored in a memory to implement the illustrated operation. Here, a description will be given of an example of fault diagnosis between the power receiving circuit 202 and the load circuit 400A in the i-th relay device 200. The operation described below is performed for fault diagnosis of any other relay device 200 and the power receiving device 300 in a similar way. It is assumed here that no fault has been detected in the power receiving circuits 202 and the load circuits 400A in the relay devices 200 up to the (i−1)-th relay device 200.

First, the main control circuit 550 transmits a second load instruction value to the load circuit 400A of the i-th relay device 200 (step S201). Then, the main control circuit 550 determines whether a second response signal (ACK) to the second load instruction value has been transmitted (step S202). If an ACK has been transmitted, the main control circuit 550 determines that none of the power receiving circuit 202 and the load circuit 400A of the i-th relay device 200 is faulty (step S203). If no ACK has been transmitted, the main control circuit 550 determines whether or not a timeout has occurred, that is, whether a first period has elapsed (step S204). If a timeout has not occurred, the main control circuit 550 waits for the transmission of an ACK until the first period elapses. If a timeout has occurred, the main control circuit 550 transmits a first load instruction value to the power transmitting circuit 201 of the (i−1)-th relay device 200 (step S205). Then, the main control circuit 550 determines whether a first response signal to the first load instruction value and voltage information (ACK) have been transmitted (step S206). If no ACK has been transmitted, the main control circuit 550 determines whether or not a timeout has occurred, that is, whether a second period has elapsed (step S207). If a timeout has not occurred, the main control circuit 550 waits for the transmission of an ACK until the second period elapses. If a timeout has occurred, the main control circuit 550 determines that the power transmitting circuit 201 of the (i−1)-th relay device 200 is faulty (step S208).

If it is determined in step S206 that an ACK to the first load instruction value has been received, the main control circuit 550 determines whether voltage information (FB signal) has been received (step S209). If no voltage information has been received, the main control circuit 550 determines that the power receiving circuit 202 of the i-th relay device 200 is faulty (step S210). If voltage information has been received, the main control circuit 550 determines that the load circuit 400A of the i-th relay device 200 is faulty (step S211).

In the illustrated example, the transmission of a second load instruction value is followed by the transmission of a first load instruction value. The order of these values may be reversed, or the first load instruction value and the second load instruction value may be transmitted simultaneously. The operation illustrated in FIGS. 15A to 15C and FIG. 16 is also applicable to the determination of fault in any other relay device 200 or the power receiving circuit 302 and the load circuit 400B in the power receiving device 300 in a similar way.

In this embodiment, as described above, if no second response signal is received from the load circuit 400A of the i-th relay device 200 (i=2 to N) (hereinafter also referred to as "the i-th load circuit 400A", and the same applied to the other components of the i-th relay device 200 and to the other relay devices 200) within a first period and if a first response signal is received from the (i−1)-th relay-side power transmitting circuit 201 but a voltage value of the i-th relay-side direct-current power is not received within a second period, the main control circuit 550 determines that not the i-th load circuit 400A but the i-th relay-side power receiving circuit 202 is faulty. In this case, the main control circuit 550 outputs a control signal indicating that the i-th relay-side power receiving circuit 202 is faulty to the display 590. On the other hand, if no second response signal is received from the i-th load circuit 400A within a first period and if a first response signal is received from the (i−1)-th relay-side power transmitting circuit 201 and a voltage value of the i-th relay-side direct-current power is received within a second period, the main control circuit 550 determines that not the i-th relay-side power receiving circuit 202 but the i-th load circuit 400A is faulty. In this case, the main control circuit 550 outputs a control signal indicating that the i-th load circuit 400A is faulty to the display 590.

The main control circuit 550 can diagnose a fault in the first relay-side power receiving circuit 202 and the first load circuit 400A by using a similar method. If no second response signal is received from the first load circuit 400A within a first period and if a first response signal is received from the power-transmitting-side power transmitting circuit 101 but a voltage value of the first relay-side direct-current power is not received within a second period, the main control circuit 550 determines that not the first load circuit 400A but the first relay-side power receiving circuit 202 is faulty, and outputs a control signal indicating that the first relay-side power receiving circuit 202 is faulty. On the other hand, if no second response signal is received from the first load circuit 400A within a first period and if a first response signal is received from the power-transmitting-side control circuit 150 within a second period and a voltage value of the first relay-side direct-current power is received, the main control circuit 550 determines that not the first relay-side power receiving circuit 202 but the first load circuit 400A is faulty, and outputs a control signal indicating that the first load circuit 400A is faulty. The main control circuit 550 can also diagnose a fault in the power-receiving-side power receiving circuit 302 and the load circuit 400B in a similar way.

As described above, the present disclosure includes wireless power transmission systems described in the following items.

[Item 1]

A wireless power transmission system including:
a power control device;
a power transmitting device;
a relay device; and
a power receiving device, wherein
the power control device includes:
a direct-current power supply; and
a main control circuit that generates a first load instruction value for the power transmitting device and a second load instruction value for the relay device,
the power transmitting device includes:
a power-transmitting-side inverter circuit that converts direct-current power provided from the direct-current power supply into power-transmitting-side alternating-current power;
a power-transmitting-side power transmitting antenna that wirelessly transmits the power-transmitting-side alternating-current power; and
a power-transmitting-side control circuit that transmits a first response signal to the first load instruction value to the power control device and controls the power-transmitting-side inverter circuit in accordance with the first load instruction value,
the relay device includes:
a relay-side power receiving circuit including:
 i) a relay-side power receiving antenna that receives the power-transmitting-side alternating-current power;
 ii) a relay-side rectifier that converts the power-transmitting-side alternating-current power into relay-side direct-current power; and
 iii) a relay-side detection circuit that detects a value corresponding to a voltage value of the relay-side direct-current power,
a relay-side power transmitting circuit including:
 i) a relay-side inverter circuit that converts the relay-side direct-current power into relay-side alternating-current power; and
 ii) a relay-side power transmitting antenna that wirelessly transmits the relay-side alternating-current power, and
a load circuit including:
 i) a load-side inverter circuit that converts the relay-side direct-current power into load-side alternating-current power;
 ii) a relay-side load that is driven by the load-side alternating-current power; and
 iii) a load-side control circuit that transmits a second response signal to the second load instruction value to the power control device and controls the relay-side load in accordance with the second load instruction value,
the power receiving device including:
a power-receiving-side power receiving antenna that receives the relay-side alternating-current power;
a power-receiving-side rectifier that converts the relay-side alternating-current power into power-receiving-side direct-current power; and
a power-receiving-side load that is driven by using the power-receiving-side direct-current power,
wherein the relay-side power receiving circuit of the relay device transmits the detected value corresponding to the voltage value of the relay-side direct-current power to the power transmitting device,
wherein the power-transmitting-side control circuit of the power transmitting device transmits the value corresponding to the voltage value of the relay-side direct-current power, which is received from the relay-side power receiving circuit, to the power control device, and
wherein the main control circuit of the power control device determines that not the load circuit but the relay-side power receiving circuit is faulty, and outputs a control signal indicating that the relay-side power receiving circuit is faulty when not receiving the second response signal from the load circuit within a first period and receiving the first response signal from the power transmitting device within a second period and not receiving the value corresponding to the voltage value of the relay-side direct-current power from the power transmitting device within the second period.

[Item 2]

The wireless power transmission system according to Item 1, wherein the power control device further includes a display, and
wherein the control signal is output from the main control circuit to the display.

[Item 3]

The wireless power transmission system according to Item 1 or 2, wherein if the second response signal is not received from the load circuit within the first period and if the first response signal is received from the power transmitting device within the second period and the value corresponding to the voltage value of the relay-side direct-current power is received from the power transmitting device within the second period, the main control circuit of the power control device determines that not the relay-side power receiving circuit but the load circuit is faulty, and outputs a control signal indicating that the load circuit is faulty.

[Item 4]

The wireless power transmission system according to any one of Items 1 to 3, wherein the value corresponding to the voltage value of the relay-side direct-current power includes the voltage value of the relay-side direct-current power, a current value of the relay-side direct-current power, a power value of the relay-side direct-current power, or an impedance value of the relay-side direct-current power.

[Item 5]

A wireless power transmission system including:
a power control device;
a power transmitting;
N relay devices; and
a power receiving device, wherein
the power transmitting device includes:
a power-transmitting-side inverter circuit that converts direct-current power into the power-transmitting-side alternating-current power;
a power-transmitting-side power transmitting antenna that wirelessly transmits the power-transmitting-side alternating-current power; and
a power-transmitting-side control circuit that controls the power-transmitting-side inverter circuit to adjust the power-transmitting-side alternating-current power, the N relay devices including:
a sequentially first relay device;
an i-th relay device, i being an integer greater than or equal to 2 and less than or equal to N, the i-th relay device including an N-th relay device; and
an (i−1)-th relay device,
the sequentially first relay device including
    a first relay-side power receiving circuit including:
        i) a first relay-side power receiving antenna that receives the power-transmitting-side alternating-current power; and
        ii) a first relay-side rectifier that converts the power-transmitting-side alternating-current power into first relay-side direct-current power, and
    a first relay-side power transmitting circuit including:
        i) a first relay-side inverter circuit that converts the first relay-side direct-current power into first relay-side alternating-current power; and
        ii) a first relay-side power transmitting antenna that wirelessly transmits the first relay-side alternating-current power,
the i-th relay device includes:
    an i-th relay-side power receiving circuit including:
        i) an i-th relay-side power receiving antenna that receives (i−1)-th relay-side alternating-current power from the (i−1)-th relay device;
        ii) an i-th relay-side rectifier that converts the (i−1)-th relay-side alternating-current power into i-th relay-side direct-current power; and
        iii) an i-th relay-side detection circuit that detects a value corresponding to a voltage value of the i-th relay-side direct-current power,
    an i-th relay-side power transmitting circuit including:
        i) an i-th relay-side inverter circuit that converts the i-th relay-side direct-current power into i-th relay-side alternating-current power; and
        ii) an i-th relay-side power transmitting antenna that wirelessly transmits the i-th relay-side alternating-current power; and
    an i-th load circuit including:
        i) an i-th load-side inverter circuit that converts the i-th relay-side direct-current power into i-th load-side alternating-current power;
        ii) an i-th relay-side load that is driven by the i-th load-side alternating-current power; and
        iii) an i-th load-side control circuit that controls the i-th relay-side load,
the power receiving device includes:
a power-receiving-side power receiving antenna that receives N-th relay-side alternating-current power from the N-th relay device;
a power-receiving-side rectifier that converts the N-th relay-side alternating-current power into power-receiving-side direct-current power; and
a power-receiving-side load that is driven by using the power-receiving-side direct-current power,
the power control device includes:
a direct-current power supply; and
a main control circuit that generates a first load instruction value for the (i−1)-th relay device and a second load instruction value for the i-th relay device,
the (i−1)-th relay device includes:
an (i−1)-th relay-side power transmitting circuit including:
    an (i−1)-th relay-side inverter circuit: and
    an (i−1)-th relay-side control circuit,
wherein the (i−1)-th relay-side power transmitting circuit transmits a first response signal to the first load instruction value to the power control device, and controls the (i−1)-th relay-side inverter circuit in accordance with the first load instruction value,
wherein the i-th load circuit of in the i-th relay device transmits a second response signal to the second load instruction value to the power control device, and controls the i-th load-side inverter circuit in accordance with the second load instruction value,
wherein the i-th relay-side power receiving circuit transmits the value corresponding to the voltage value of the i-th relay-side direct-current power detected by the i-th relay-side detection circuit to the (i−1)-th relay device,
wherein the (i−1)-th relay-side control circuit transmits the value corresponding to the voltage value of the i-th relay-side direct-current power, which is received from the i-th relay-side power receiving circuit, to the power control device, and
wherein the power control device determines that not the i-th load circuit but the i-th relay-side power receiving circuit is faulty, and outputs a control signal indicating that the i-th relay-side power receiving circuit is faulty when not receiving the second response signal from the i-th load circuit within a first period and receiving the first response signal from the (i−1)-th relay-side power transmitting circuit within a second period and not receiving the value corresponding to the voltage value of the i-th relay-side direct-current power from the (i−1)-th relay-side power transmitting circuit within the second period.

[Item 6]

The wireless power transmission system according to Item 5, wherein the power control device further includes a display, and
wherein the control signal is output from the main control circuit to the display.

[Item 7]

The wireless power transmission system according to Item 5 or 6, wherein if the second response signal is not received from the i-th load circuit within the first period and if the first response signal is received from the (i−1)-th relay-side power transmitting circuit within the second period and the value corresponding to the voltage value of the i-th relay-side direct-current power is received from the (i−1)-th relay-side power transmitting circuit within the second period, the main control circuit of the power control device determines that not the i-th relay-side power receiving circuit but the i-th load circuit is faulty, and outputs a control signal indicating that the i-th load circuit is faulty.

[Item 8]

The wireless power transmission system according to any one of Items 5 to 7, wherein the value corresponding to the voltage value of the i-th relay-side direct-current power includes the voltage value of the i-th relay-side direct-current power, a current value of the i-th relay-side direct-current power, a power value of the i-th relay-side direct-current power, or an impedance value of the i-th relay-side direct-current power.

[Item 9]

The wireless power transmission system according to any one of Items 5 to 8, wherein the sequentially first relay device further includes
a first load circuit including
    i) a first load-side inverter circuit that converts the first relay-side direct-current power into first load-side alternating-current power, ii) a first relay-side load that is driven by the first load-side alternating-current power, and iii) a first load-side control circuit that controls the first relay-side load, wherein the main control circuit included in the power control device generates a third load instruction value for the power transmitting device and a fourth load instruction value for the sequentially first relay device, wherein the power-transmitting-side control circuit included in the power transmitting device transmits a third response signal to the third load instruction value to the power control device, and controls the power-transmitting-side inverter circuit in accordance with the third load instruction value, wherein the first load circuit included in the sequentially first relay device transmits a fourth response signal to the fourth load instruction value to the power control device, and controls the first load-side inverter circuit in accordance with the fourth load instruction value, wherein the first relay-side power receiving circuit included in the sequentially first relay device further includes a first relay-side detection circuit that detects a value corresponding to a voltage value of the first relay-side direct-current power, and transmits the detected value corresponding to the voltage value of the first relay-side direct-current power to the power transmitting device, wherein the power-transmitting-side control circuit included in the power transmitting device transmits the value corresponding to the voltage value of the first relay-side direct-current power, which is received from the first relay-side power receiving circuit, to the power control device, and wherein if the fourth response signal is not received from the first load circuit within the first period and if the third response signal is received from the power-transmitting-side control circuit within the second period and the value corresponding to the voltage value of the first relay-side direct-current power is not received from the power-transmitting-side control circuit within the second period, the main control circuit of the power control device determines that not the first load circuit but the first relay-side power receiving circuit is faulty, and outputs a control signal indicating that the first relay-side power receiving circuit is faulty.

[Item 10]

The wireless power transmission system according to Item 9, wherein if the fourth response signal is not received from the first load circuit within the first period and if the third response signal is received from the power-transmitting-side control circuit within the second period and the value corresponding to the voltage value of the first relay-side direct-current power is received from the power-transmitting-side control circuit within the second period, the main control circuit of the power control device determines that not the first relay-side power receiving circuit but the first load circuit is faulty, and outputs a control signal indicating that the first load circuit is faulty.

[Item 11]

The wireless power transmission system according to Item 9 or 10, wherein the value corresponding to the voltage value of the first relay-side direct-current power includes the voltage value of the first relay-side direct-current power, a current value of the first relay-side direct-current power, a power value of the first relay-side direct-current power, or an impedance value of the first relay-side direct-current power.

The technique of the present disclosure is applicable to any device driven by power, such as in a surveillance camera or a robot.

What is claimed is:

1. A wireless power transmission system comprising:
a power control device;
a power transmitting device;
a relay device; and
a power receiving device, wherein
the power control device includes:
  a direct-current power supply; and
  a main control circuit that generates a first load instruction value for the power transmitting device and a second load instruction value for the relay device,
the power transmitting device includes:
  a power-transmitting-side inverter circuit that converts direct-current power provided from the direct-current power supply into power-transmitting-side alternating-current power;
  a power-transmitting-side power transmitting antenna that wirelessly transmits the power-transmitting-side alternating-current power; and
  a power-transmitting-side control circuit that transmits a first response signal to the first load instruction value to the power control device and controls the power-transmitting-side inverter circuit in accordance with the first load instruction value,
the relay device includes:
  a relay-side power receiving circuit including:
    i) a relay-side power receiving antenna that receives the power-transmitting-side alternating-current power;
    ii) a relay-side rectifier that converts the power-transmitting-side alternating-current power into relay-side direct-current power; and
    iii) a relay-side detection circuit that detects a value corresponding to a voltage value of the relay-side direct-current power,
  a relay-side power transmitting circuit including:
    i) a relay-side inverter circuit that converts the relay-side direct-current power into relay-side alternating-current power; and
    ii) a relay-side power transmitting antenna that wirelessly transmits the relay-side alternating-current power, and
  a load circuit including:
    i) a load-side inverter circuit that converts the relay-side direct-current power into load-side alternating-current power;
    ii) a relay-side load that is driven by the load-side alternating-current power; and
    iii) a load-side control circuit that transmits a second response signal to the second load instruction value to the power control device and controls the relay-side load in accordance with the second load instruction value,
the power receiving device including:
  a power-receiving-side power receiving antenna that receives the relay-side alternating-current power;
  a power-receiving-side rectifier that converts the relay-side alternating-current power into power-receiving-side direct-current power; and
  a power-receiving-side load that is driven by using the power-receiving-side direct-current power,
wherein the relay-side power receiving circuit of the relay device transmits the detected value corresponding to the voltage value of the relay-side direct-current power to the power transmitting device, wherein the power-transmitting-side control circuit of the power transmitting device transmits the value corresponding to the voltage value of the relay-side direct-current power, which is received from the relay-side power receiving circuit, to the power control device, and wherein the main control circuit of the power control device determines that not the load circuit but the relay-side power receiving circuit is faulty, and outputs a control signal indicating that the relay-side power receiving circuit is faulty when not receiving the second response signal from the load circuit within a first period and receiving the first response signal from the power transmitting device within a second period and not receiving the value corresponding to the voltage value of the relay-side direct-current power from the power transmitting device within the second period.

2. The wireless power transmission system according to claim 1, wherein the power control device further includes a display, and wherein the control signal is output from the main control circuit to the display.

3. The wireless power transmission system according to claim 1, wherein if the second response signal is not received from the load circuit within the first period and if the first response signal is received from the power transmitting device within the second period and the value corresponding to the voltage value of the relay-side direct-current power is received from the power transmitting device within the second period, the main control circuit of the power control device determines that not the relay-side power receiving circuit but the load circuit is faulty, and outputs a control signal indicating that the load circuit is faulty.

4. The wireless power transmission system according to claim 1, wherein the value corresponding to the voltage value of the relay-side direct-current power includes the voltage value of the relay-side direct-current power, a current value of the relay-side direct-current power, a power value of the relay-side direct-current power, or an impedance value of the relay-side direct-current power.

5. A wireless power transmission system comprising:
a power control device;
a power transmitting;
N relay devices; and
a power receiving device, wherein
the power transmitting device includes:
  a power-transmitting-side inverter circuit that converts direct-current power into the power-transmitting-side alternating-current power;
  a power-transmitting-side power transmitting antenna that wirelessly transmits the power-transmitting-side alternating-current power; and
  a power-transmitting-side control circuit that controls the power-transmitting-side inverter circuit to adjust the power-transmitting-side alternating-current power,
the N relay devices including:
  a sequentially first relay device;
  an i-th relay device, i being an integer greater than or equal to 2 and less than or equal to N, the i-th relay device including an N-th relay device; and
  an (i−1)-th relay device,
  the sequentially first relay device including
    a first relay-side power receiving circuit including:
      i) a first relay-side power receiving antenna that receives the power-transmitting-side alternating-current power; and
      ii) a first relay-side rectifier that converts the power-transmitting-side alternating-current power into first relay-side direct-current power, and
    a first relay-side power transmitting circuit including:
      i) a first relay-side inverter circuit that converts the first relay-side direct-current power into first relay-side alternating-current power; and
      ii) a first relay-side power transmitting antenna that wirelessly transmits the first relay-side alternating-current power,
  the i-th relay device includes:
    an i-th relay-side power receiving circuit including:
      i) an i-th relay-side power receiving antenna that receives (i−1)-th relay-side alternating-current power from the (i−1)-th relay device;
      ii) an i-th relay-side rectifier that converts the (i−1)-th relay-side alternating-current power into i-th relay-side direct-current power; and
      iii) an i-th relay-side detection circuit that detects a value corresponding to a voltage value of the i-th relay-side direct-current power,
    an i-th relay-side power transmitting circuit including:
      i) an i-th relay-side inverter circuit that converts the i-th relay-side direct-current power into i-th relay-side alternating-current power; and
      ii) an i-th relay-side power transmitting antenna that wirelessly transmits the i-th relay-side alternating-current power; and
    an i-th load circuit including:
      i) an i-th load-side inverter circuit that converts the i-th relay-side direct-current power into i-th load-side alternating-current power;
      ii) an i-th relay-side load that is driven by the i-th load-side alternating-current power; and
      iii) an i-th load-side control circuit that controls the i-th relay-side load,
the power receiving device includes:
  a power-receiving-side power receiving antenna that receives N-th relay-side alternating-current power from the N-th relay device;
  a power-receiving-side rectifier that converts the N-th relay-side alternating-current power into power-receiving-side direct-current power; and
  a power-receiving-side load that is driven by using the power-receiving-side direct-current power,
the power control device includes:
  a direct-current power supply; and
  a main control circuit that generates a first load instruction value for the (i−1)-th relay device and a second load instruction value for the i-th relay device,
the (i−1)-th relay device includes:
  an (i−1)-th relay-side power transmitting circuit including:
    an (i−1)-th relay-side inverter circuit: and
    an (i−1)-th relay-side control circuit,
wherein the (i−1)-th relay-side power transmitting circuit transmits a first response signal to the first load instruction value to the power control device, and controls the (i−1)-th relay-side inverter circuit in accordance with the first load instruction value, wherein the i-th load circuit of in the i-th relay device transmits a second response signal to the second load instruction value to the power control device, and controls the i-th load-side inverter circuit in accordance with the second load instruction value, wherein the i-th relay-side power receiving circuit transmits the value corresponding to the voltage value of the i-th relay-side direct-current power detected by the i-th relay-side detection circuit to the (i−1)-th relay device, wherein the (i−1)-th relay-side control circuit transmits the value corresponding to the voltage value of the i-th relay-side direct-current power, which is received from the i-th relay-side power receiving circuit, to the power control device, and wherein the power control device determines that not the i-th load circuit but the i-th relay-side power receiving circuit is faulty, and outputs a control signal indicating that the i-th relay-side power receiving circuit is faulty when not receiving the second response signal from the i-th load circuit within a first period and receiving the first response signal from the (i−1)-th relay-side power transmitting circuit within a second period and not receiving the value corresponding to the voltage value of the i-th relay-side direct-current power from the (i−1)-th relay-side power transmitting circuit within the second period.

6. The wireless power transmission system according to claim 5, wherein the power control device further includes a display, and wherein the control signal is output from the main control circuit to the display.

7. The wireless power transmission system according to claim 5, wherein if the second response signal is not received from the i-th load circuit within the first period and if the first response signal is received from the (i−1)-th relay-side power transmitting circuit within the second period and the value corresponding to the voltage value of the i-th relay-side direct-current power is received from the (i−1)-th relay-side power transmitting circuit within the second period, the main control circuit of the power control device determines that not the i-th relay-side power receiving circuit but the i-th load circuit is faulty, and outputs a control signal indicating that the i-th load circuit is faulty.

8. The wireless power transmission system according to claim 5, wherein the value corresponding to the voltage value of the i-th relay-side direct-current power includes the voltage value of the i-th relay-side direct-current power, a current value of the i-th relay-side direct-current power, a power value of the i-th relay-side direct-current power, or an impedance value of the i-th relay-side direct-current power.

9. The wireless power transmission system according to claim 5, wherein the sequentially first relay device further includes a first load circuit including
i) a first load-side inverter circuit that converts the first relay-side direct-current power into first load-side alternating-current power,
ii) a first relay-side load that is driven by the first load-side alternating-current power, and
iii) a first load-side control circuit that controls the first relay-side load, wherein the main control circuit included in the power control device generates a third load instruction value for the power transmitting device and a fourth load instruction value for the sequentially first relay device, wherein the power-transmitting-side control circuit included in the power transmitting device transmits a third response signal to the third load instruction value to the power control device, and controls the power-transmitting-side inverter circuit in accordance with the third load instruction value, wherein the first load circuit included in the sequentially first relay device transmits a fourth response signal to the fourth load instruction value to the power control device, and controls the first load-side inverter circuit in accordance with the fourth load instruction value, wherein the first relay-side power receiving circuit included in the sequentially first relay device further includes a first relay-side detection circuit that detects a value corresponding to a voltage value of the first relay-side direct-current power, and transmits the detected value corresponding to the voltage value of the first relay-side direct-current power to the power transmitting device, wherein the power-transmitting-side control circuit included in the power transmitting device transmits the value corresponding to the voltage value of the first relay-side direct-current power, which is received from the first relay-side power receiving circuit, to the power control device, and wherein if the fourth response signal is not received from the first load circuit within the first period and if the third response signal is received from the power-transmitting-side control circuit within the second period and the value corresponding to the voltage value of the first relay-side direct-current power is not received from the power-transmitting-side control circuit within the second period, the main control circuit of the power control device determines that not the first load circuit but the first relay-side power receiving circuit is faulty, and outputs a control signal indicating that the first relay-side power receiving circuit is faulty.

10. The wireless power transmission system according to claim 9, wherein if the fourth response signal is not received from the first load circuit within the first period and if the third response signal is received from the power-transmitting-side control circuit within the second period and the value corresponding to the voltage value of the first relay-side direct-current power is received from the power-transmitting-side control circuit within the second period, the main control circuit of the power control device determines that not the first relay-side power receiving circuit but the first load circuit is faulty, and outputs a control signal indicating that the first load circuit is faulty.

11. The wireless power transmission system according to claim 9, wherein the value corresponding to the voltage value of the first relay-side direct-current power includes the voltage value of the first relay-side direct-current power, a current value of the first relay-side direct-current power, a power value of the first relay-side direct-current power, or an impedance value of the first relay-side direct-current power.

\* \* \* \* \*